(12) United States Patent
Zhao et al.

(10) Patent No.: US 11,178,396 B2
(45) Date of Patent: Nov. 16, 2021

(54) CONSTRAINED INTRA PREDICTION AND UNIFIED MOST PROBABLE MODE LIST GENERATION

(71) Applicant: TENCENT AMERICA LLC, Palo Alto, CA (US)

(72) Inventors: Xin Zhao, San Diego, CA (US); Xiang Li, Los Gatos, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/672,665

(22) Filed: Nov. 4, 2019

(65) Prior Publication Data

US 2020/0154100 A1    May 14, 2020

Related U.S. Application Data

(60) Provisional application No. 62/805,163, filed on Feb. 13, 2019, provisional application No. 62/788,834, (Continued)

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
CPC .... H04N 19/105; H04N 19/159; H04N 19/46; H04N 19/176; H04N 19/593
(Continued)

(56) References Cited

U.S. PATENT DOCUMENTS 10,694,181 B2 * 6/2020 Zhang .................... H04N 19/82
10,917,637 B2 * 2/2021 Yoo ...................... H04N 19/103
(Continued)

FOREIGN PATENT DOCUMENTS

CA          2 981 916 A1    10/2016
WO      2016200984 A1    12/2016

OTHER PUBLICATIONS

Joint Video Exploration Team (JVET) of ITU-T SG 16 WP 3 and ISO/IEC JTC 1/SC 29/WG 11 4th Meeting: Chengdu, CN, Oct. 15-21, 2016 (hereinafter, "JVET-D1001") (Year: 2016).*
(Continued)

*Primary Examiner* — Tung T Vo
(74) *Attorney, Agent, or Firm* — Sughrue Mion, PLLC

(57) ABSTRACT

A method of selecting a reference sample used to encode a current block in an encoded video bitstream using at least one processor includes determining that a constrained intra prediction (CIP) mode is enabled; determining that a neighboring sample of the current block belongs to a coding block that is coded using intra block copy (IBC) coding; based on the determining that the neighboring sample belongs to the coding block that is coded using the IBC coding, selecting the neighboring sample as the reference sample; and encoding the current block using intra prediction coding based on the reference sample.

20 Claims, 18 Drawing Sheets

Related U.S. Application Data filed on Jan. 5, 2019, provisional application No. 62/767,472, filed on Nov. 14, 2018.

(51) Int. Cl.
 *H04N 19/46* (2014.01)
 *H04N 19/159* (2014.01)

(58) Field of Classification Search
 USPC .................................................. 375/240.02
 See application file for complete search history.

(56) References Cited

U.S. PATENT DOCUMENTS

| | | | |
|---|---|---|---|
| 2015/0063440 A1* | 3/2015 | Pang | H04N 19/174 |
| | | | 375/240.02 |
| 2017/0099490 A1 | 4/2017 | Seregin et al. | |
| 2018/0176587 A1* | 6/2018 | Panusopone | H04N 19/105 |
| 2018/0220130 A1* | 8/2018 | Zhang | H04N 19/159 |
| 2019/0327466 A1* | 10/2019 | Ikai | H04N 19/186 |
| 2020/0154115 A1* | 5/2020 | Ramasubramonian | H04N 19/186 |
| 2020/0213612 A1* | 7/2020 | Liu | H04N 19/70 |
| 2020/0260070 A1* | 8/2020 | Yoo | H04N 19/103 |
| 2020/0296391 A1* | 9/2020 | Choi | H04N 19/176 |
| 2020/0304780 A1* | 9/2020 | Li | H04N 19/11 |
| 2020/0322623 A1* | 10/2020 | Chiang | H04N 19/105 |
| 2020/0359033 A1* | 11/2020 | Ramasubramonian | H04N 19/91 |
| 2020/0366911 A1* | 11/2020 | Choi | H04N 19/172 |
| 2021/0014520 A1* | 1/2021 | Zhang | H04N 19/52 |
| 2021/0021841 A1* | 1/2021 | Xu | H04N 19/80 |

OTHER PUBLICATIONS

International Search Report dated Jan. 29, 2020 from the International Searching Authority in International Application No. PCT/US19/60902.

Written Opinion dated Jan. 29, 2020 from the International Bureau in International Application No. PCT/US19/60902.

\* cited by examiner

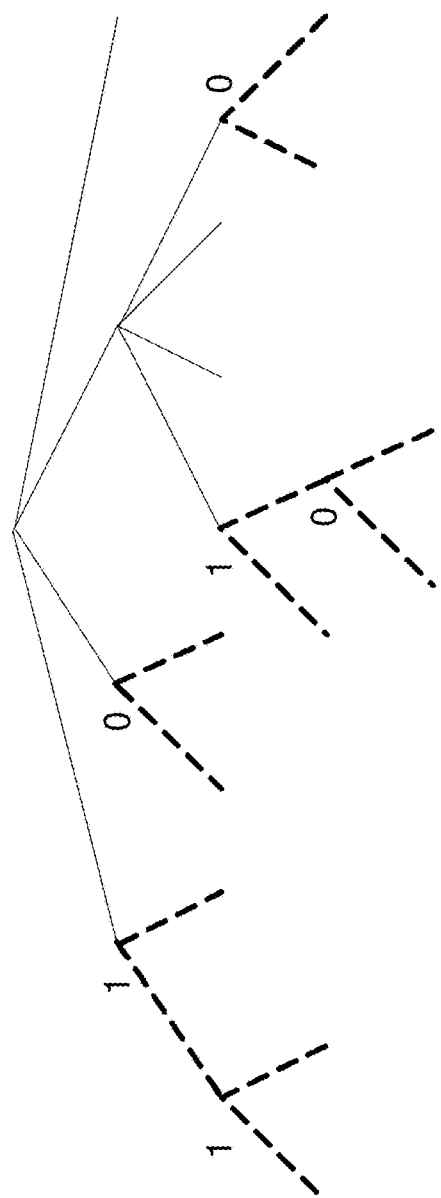
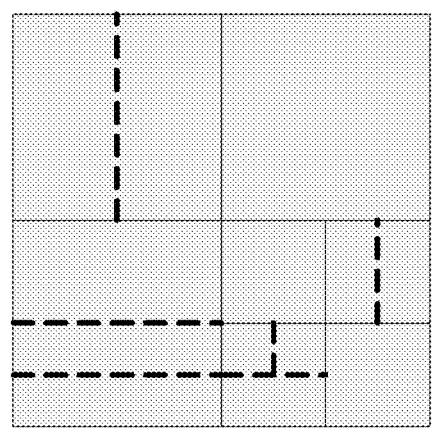
FIG. 1

FIG. 15   Encoder 1303

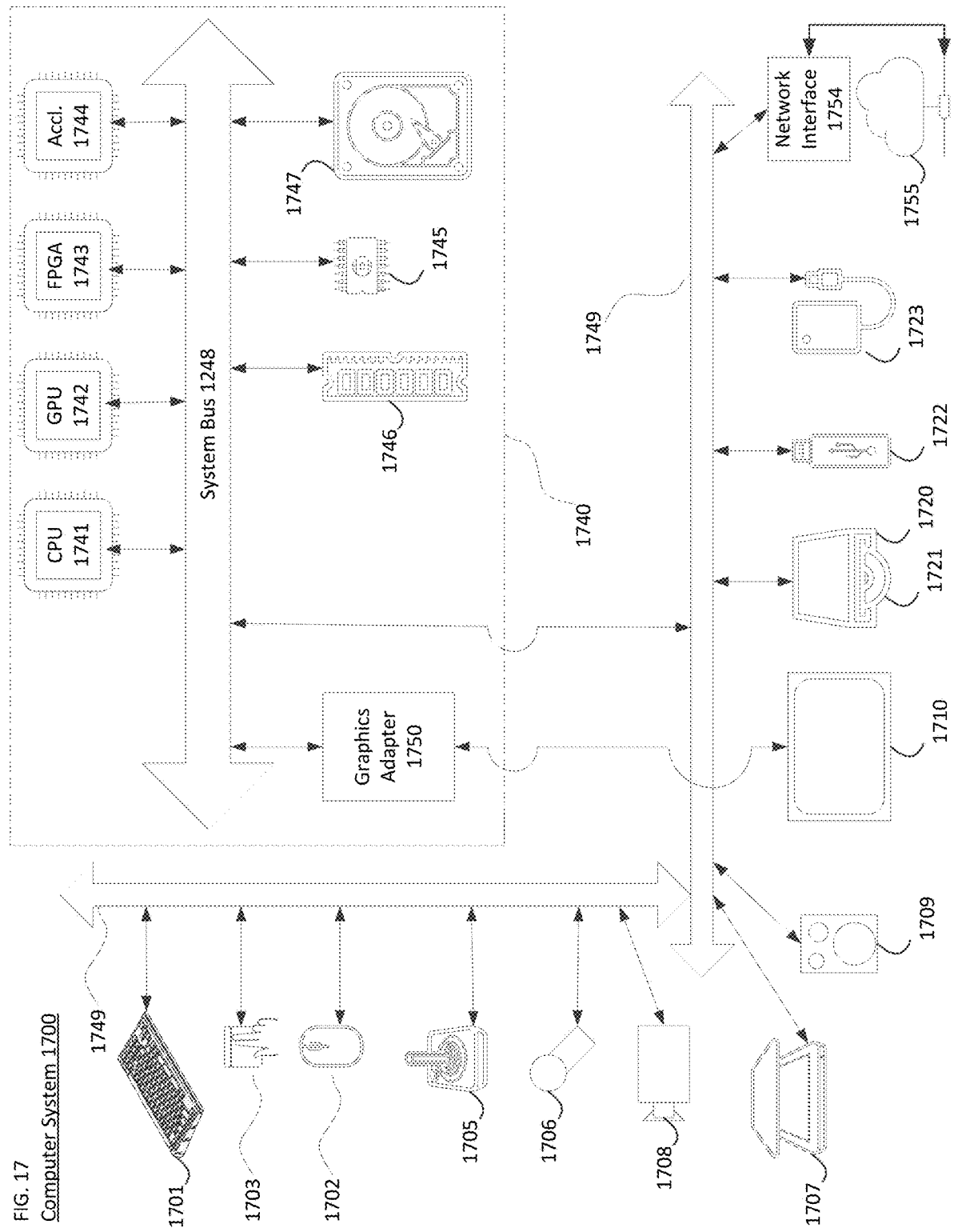

US 11,178,396 B2

CONSTRAINED INTRA PREDICTION AND UNIFIED MOST PROBABLE MODE LIST GENERATION

CROSS-REFERENCE TO RELATED APPLICATION

This application claims priority from U.S. Provisional Patent Application No. 62/767,472, filed on Nov. 14, 2018, U.S. Provisional Patent Application No. 62/788,834, filed on Jan. 5, 2019, and U.S. Provisional Patent Application No. 62/805,163, filed on Feb. 13, 2019 in the United States Patent and Trademark Office, the disclosures of which are incorporated herein by reference in their entirety.

FIELD

The present disclosure relates to advanced video coding technologies. More specifically, the present disclosure relates to methods for implementing constrained intra prediction and most probable mode list generation.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

According to an embodiment, a method of selecting a reference sample used to encode a current block in an encoded video bitstream using at least one processor includes determining that a constrained intra prediction (CIP) mode is enabled; determining that a neighboring sample of the current block belongs to a coding block that is coded using intra block copy (IBC) coding; based on the determining that the neighboring sample belongs to the coding block that is coded using the IBC coding, selecting the neighboring sample as the reference sample; and encoding the current block using intra prediction coding based on the reference sample.

According to an embodiment, a device for selecting a reference sample used to encode a current block in an encoded video bitstream may include at least one memory configured to store program code; and at least one processor configured to read the program code and operate as instructed by the program code, the program code including: first determining code configured to cause the at least one processor to determine that a constrained intra prediction (CIP) mode is enabled; second determining code configured to cause the at least one processor to determine that a neighboring sample of the current block belongs to a coding block that is coded using intra block copy (IBC) coding; selecting code configured to cause the at least one processor to, based on the neighboring sample belonging to the coding block that is coded using the IBC coding, select the neighboring sample as the reference sample; and encoding code configured to cause the at least one processor to encode the current block using intra prediction coding based on the reference sample.

According to an embodiment, a non-transitory computer-readable medium may store instructions including one or more instructions that, when executed by one or more processors of a device for selecting a reference sample used to encode a current block in an encoded video bitstream, cause the one or more processors to: determine that a constrained intra prediction (CIP) mode is enabled; determine that a neighboring sample of the current block belongs to a coding block that is coded using intra block copy (IBC) coding; based on the determining that the neighboring sample belongs to the coding block that is coded using the IBC coding, select the neighboring sample as the reference sample; and encode the current block using intra prediction coding based on the reference sample.

BRIEF DESCRIPTION OF THE DRAWINGS

Further features, the nature, and various advantages of the disclosed subject matter will be more apparent from the following detailed description and the accompanying drawings in which:

FIG. 1 illustrates an example of a Quad Tree Binary Tree (QTBT) structure according to an embodiment.

FIG. 17 is a diagram of a computer system in accordance with an embodiment.

DETAILED DESCRIPTION

Figure 2:
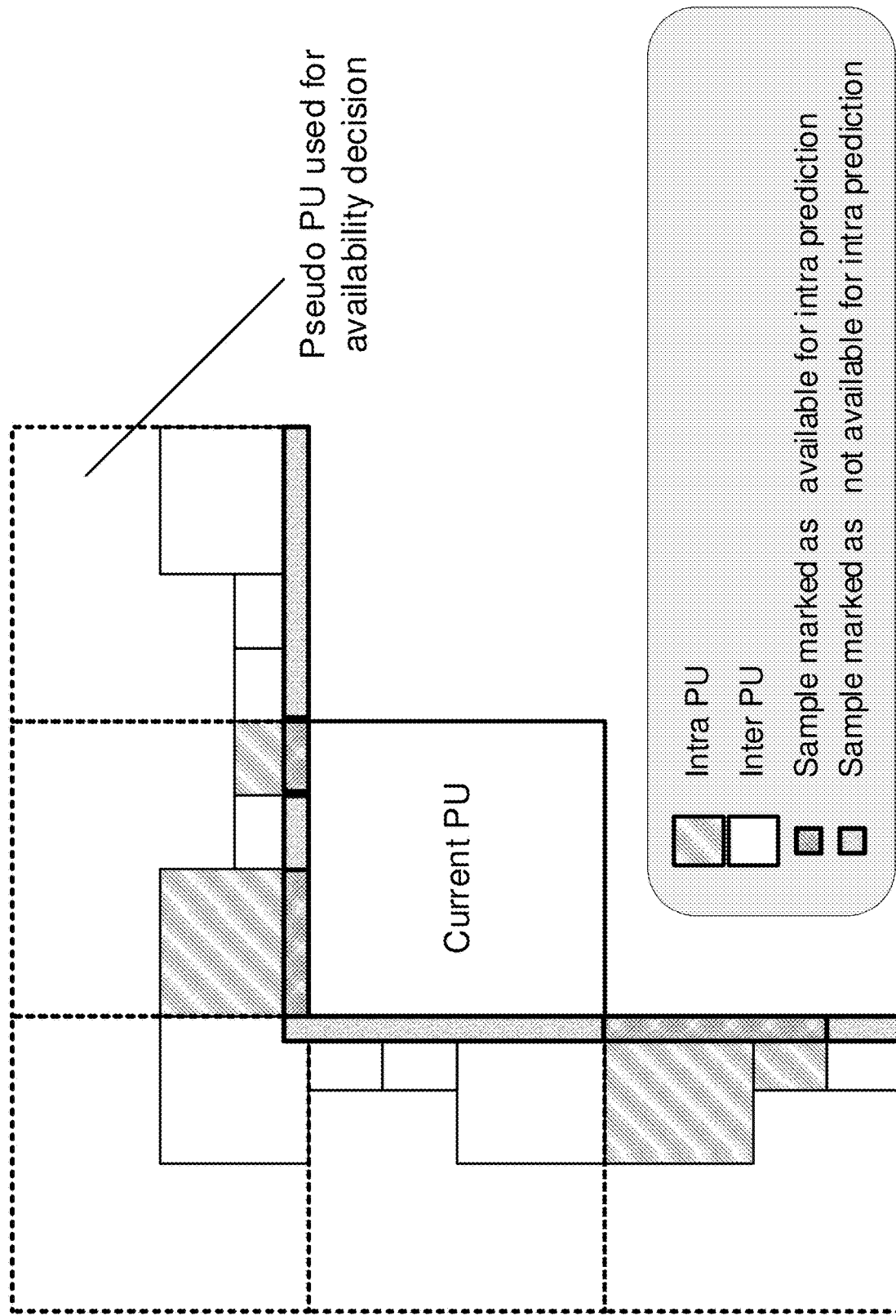
FIG. 2 illustrates an example of neighboring sample availability for constrained intra prediction.

The embodiments disclosed in the present disclosure may be used separately or combined in any order. Further, each of the embodiments may be implemented by processing circuitry (e.g., one or more processors or one or more integrated circuits). In one example, the one or more processors execute a program that is stored in a non-transitory computer-readable medium.

In HEVC, a coding tree unit (CTU) is split into coding units (CUs) by using a quadtree structure, which may be referred to as a coding tree, to adapt to various local characteristics. A decision of whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining a residual block by applying the prediction process based on the PU splitting type, a CU can be partitioned into transform units (TUs) according to another quadtree structure similar to the coding tree for the CU. A feature of the HEVC structure is that it has the multiple partition conceptions including CU, PU and TU. In HEVC, a CU or a TU can only be square shape, while a PU may be square or rectangular shape for an inter predicted block. In later stage of HEVC some proposals existed to allow rectangular shape PUs for intra prediction and transform. These proposals were not adopted to HEVC but extended to be used in JEM.

At a picture boundary, HEVC imposes an implicit quad-tree split so that a block will keep quad-tree splitting until the size fits the picture boundary.

According to an embodiment, a Quad Tree Binary Tree (QTBT) structure may remove the concepts of multiple partition types. For example, a QTBT structure may remove the separation of the CU, PU and TU concepts, and may support more flexibility for CU partition shapes. In the QTBT block structure, a CU can have either a square or rectangular shape. As shown in the example illustrated in FIG. 1, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes may be called coding units (CUs), and that segmentation may be used for prediction and transform processing without any further partitioning. This means that the CU, PU and TU have the same block size in the QTBT coding block structure. In VVC, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters may be used for the QTBT partitioning scheme:
CTU size: the root node size of a quadtree, the same concept as in HEVC
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In one example of the QTBT partitioning structure, a CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning may be applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node may also be the root node for the binary tree and have a binary tree depth of 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

The left portion of FIG. 1 illustrates an example of block partitioning by using QTBT, and the right portion of FIG. 1 illustrates the corresponding tree representation. The solid lines indicate quadtree splitting and dotted lines indicate binary tree splitting. In each splitting (i.e., non-leaf) node of the binary tree, one flag may be signalled to indicate which splitting type (i.e., horizontal or vertical) is used. For example, 0 may indicate horizontal splitting and 1 may indicate vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Constrained intra prediction may be used to avoid spatial reconstruction error propagations caused by spatial intra prediction with encoder-decoder mismatched reference pixels. The encoder-decoder mismatched reference pixels can appear when packet loss happens in transmitting inter-coded slices. They can also appear when lossy decoder-side memory compression is used. Such spatial noise propagations are fixed-pattern noise and unacceptably noticeable. Therefore, constrained intra prediction would be useful not only for enabling robust video transmission over unreliable networks but also for allowing decoders to use their own lossy decoder-side memory compression technique.

The constrained intra prediction scheme of HEVC is similar to that of H.264/MPEG-4 AVC. When constrained intra prediction is enabled, inter-predicted samples are marked as not available for intra prediction, as shown in FIG. 2.

FIG. 2 shows an example for availability decision of neighboring samples in the proposed constrained intra prediction. If a reference sample comes from an inter-coded block, it is marked as "not available for intra prediction." Otherwise, it is marked as "available for intra prediction." Availability of above right, above left, left and below left samples is derived in a similar way. The unavailable reference samples are then padded from the available reference samples that come from an intra coded block.

In the current VVC test mode, VTM-3.0, the same scheme of CIP in HEVC is re-used.

Figure 3:
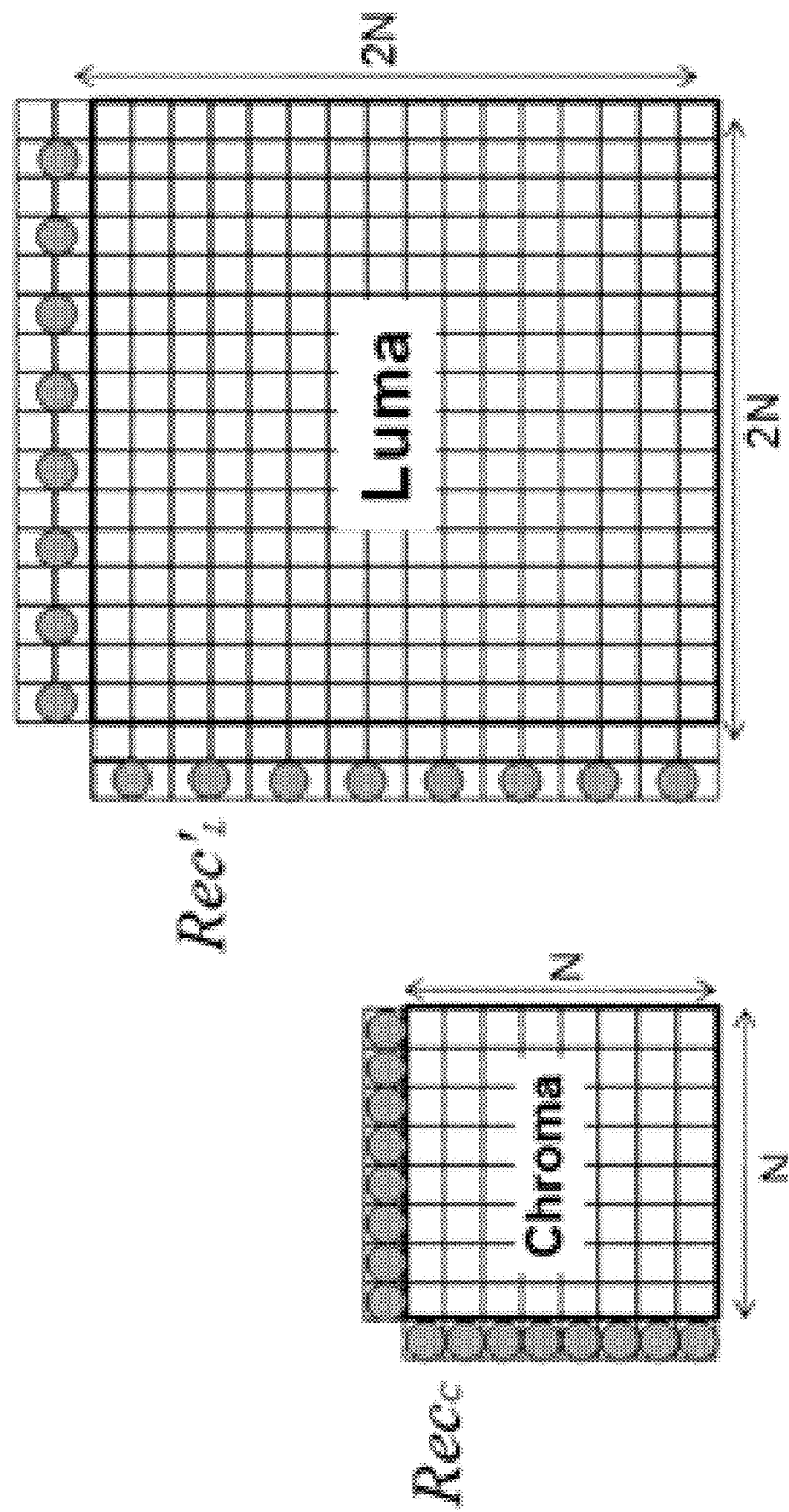
FIG. 3 illustrates an example of locations of the samples used for the derivation of $\alpha$ and $\beta$, according to an embodiment.

To reduce the cross-component redundancy, a cross-component linear model (CCLM) prediction mode may be used in VTM. In the CCLM mode, chroma samples may be predicted based on reconstructed luma samples of the same CU by using a linear model as follows in Equation 1:

$$pred_C(i,j) = \alpha \cdot rec_L'(i,j) + \beta \quad \text{(Equation 1)}$$

where pred_C (i,j) represents the predicted chroma samples in a CU and rec_L (i,j) represents the downsampled reconstructed luma samples of the same CU. Parameters $\alpha$ and $\beta$ are derived by minimizing the regression error between the neighbouring reconstructed luma and chroma samples around the current block as follows in Equation 2 and Equation 3:

$$\alpha = \frac{N \cdot \sum (L(n) \cdot C(n)) - \sum L(n) \cdot \sum C(n)}{N \cdot \sum (L(n) \cdot L(n)) - \sum L(N) \cdot \sum L(n)} \quad \text{(Equation 2)}$$

$$\beta = \frac{\sum C(n) \cdot \alpha \cdot \sum L(n)}{N} \quad \text{(Equation 3)}$$

where L(n) represents the down-sampled top and left neighbouring reconstructed luma samples, C(n) represents the top and left neighbouring reconstructed chroma samples, and value of N is equal to twice of the minimum of width and height of the current chroma coding block. For a coding block with a square shape, the above two equations may be applied directly. For a non-square coding block, the neighbouring samples of the longer boundary may first be sub-sampled to have the same number of samples as for the shorter boundary. FIG. 3 shows examples of the location of the left and above samples and the sample of the current block involved in the CCLM mode.

This regression error minimization computation is performed as part of the decoding process and is not just as an encoder search operation. As a result, no syntax is used to convey the $\alpha$ and $\beta$ values to the decoder.

When Constrained Intra Prediction (CIP) is enabled, if any of the above neighboring reference samples come from a block that is not intra coded, then the whole above reference row is marked as unavailable and not considered for deriving the parameters of CCLM. If any of the left neighboring reference samples come from a block that is not intra coded, then the whole left reference column is marked as unavailable and not considered for deriving the parameters of CCLM.

For chroma intra mode coding, a total of 6 intra modes are allowed for chroma intra mode coding. Those modes include five traditional intra modes and one cross-component linear model mode (CCLM).

Figure 4:
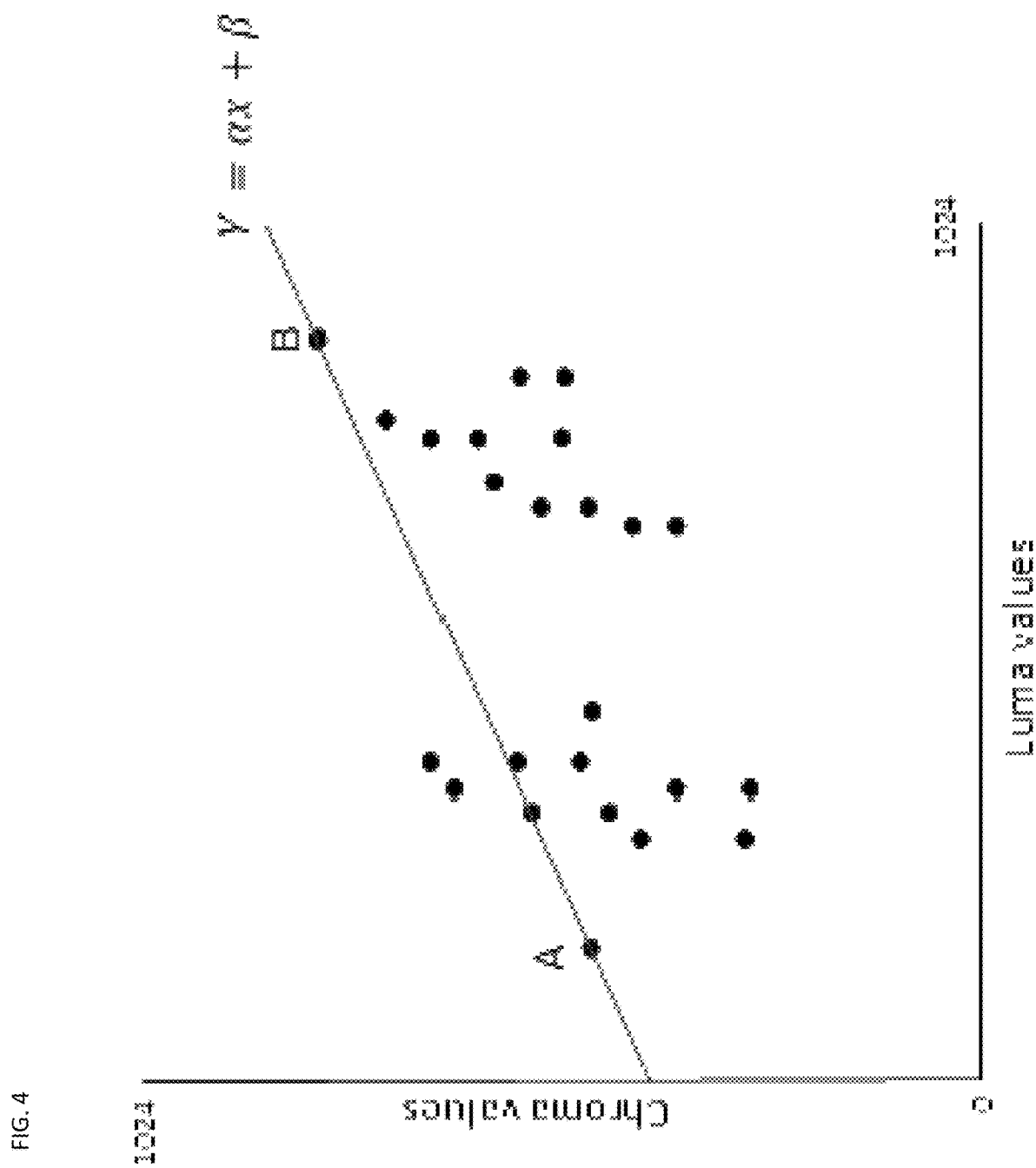
FIG. 4 illustrates a straight line between minimum and maximum luma values, according to an embodiment.

In JVET-L0191, it is proposed to replace the LMS algorithm for deriving the linear model parameters $\alpha$ and $\beta$ by a straight-line equation. The two points (couple of Luma and Chroma) are the minimum (A) and maximum (B) values inside the set of neighboring Luma samples as depicted in FIG. 4.

Where the linear model parameters $\alpha$ and $\beta$ are obtained according to Equation 4 as follows:

$$\alpha = \frac{y_B - y_A}{x_B - x_A} \quad \text{(Equation 4)}$$

$$\beta = y_A - \alpha x_A$$

In VTM-3.0, the division is avoided and replaced by a multiplication and a shift. In JVET-L0340, a multi-directional CCLM (MDLM) mode is proposed. Instead of using both left and above reference samples for deriving the model parameters used in CCLM, only one side of reference samples is used in MDLM for deriving the model parameters.

Figure 5:
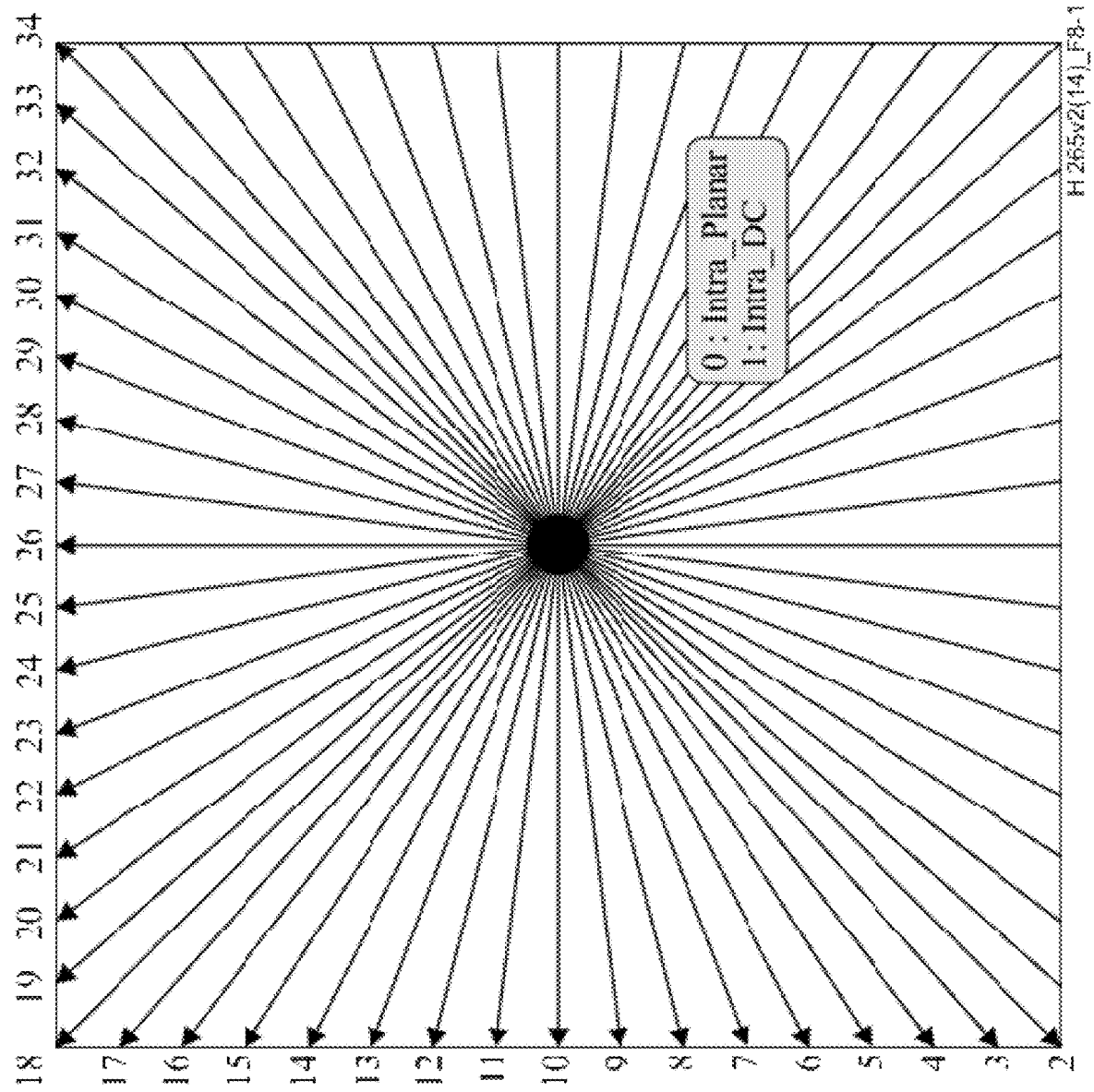
FIG. 5 illustrates intra prediction modes in HEVC, according to an embodiment.

The intra prediction modes used in HEVC are illustrated in FIG. 5. In HEVC, there are total 35 intra prediction modes, among which mode 10 is horizontal mode, mode 26 is vertical mode, and mode 2, mode 18 and mode 34 are diagonal modes. The intra prediction modes are signalled by three most probable modes (MPMs) and 32 remaining modes.

Figure 6:
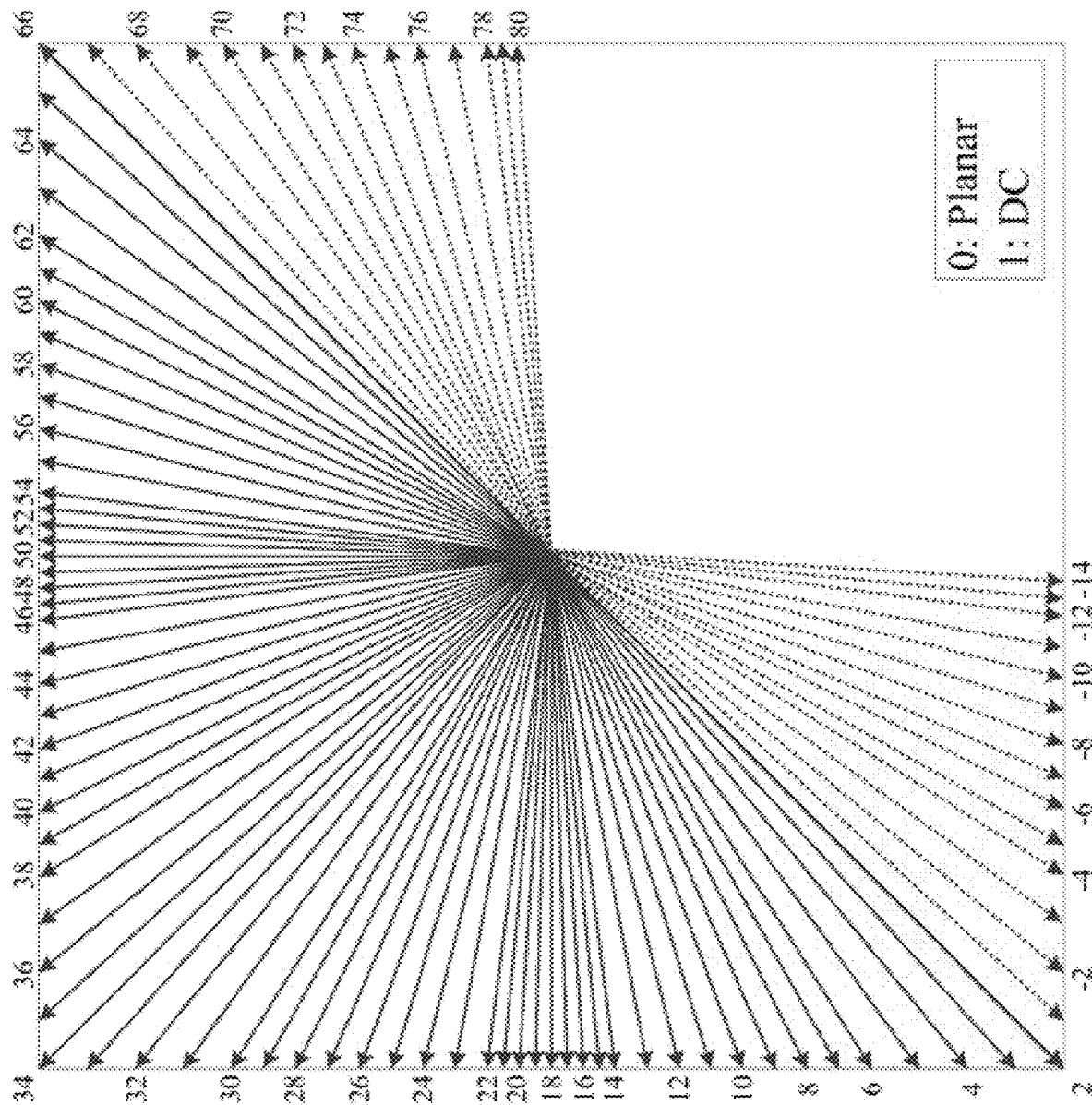
FIG. 6 illustrates 87 intra prediction modes defined in VVC draft 2, according to an embodiment.

In some developments of VVC, there are total 95 intra prediction modes as shown in FIG. 6, where mode 18 is horizontal mode, mode 50 is vertical mode, and mode 2, mode 34 and mode 66 are diagonal modes. Modes −1~−14 and Modes 67~80 may be referred to as Wide-Angle Intra Prediction (WAIP) modes.

To code an intra mode, a most probable mode (MPM) list of size 3 may be built based on the intra modes of the neighboring blocks. this MPM list will be referred to as the MPM list or primary MPM list. If intra mode is not from the MPM list, a flag is signalled to indicate whether intra mode belongs to the selected modes.

An example of the MPM list generation process is shown is follows. Here, leftIntraDir is used to indicate the mode in left block and aboveIntraDir is used to indicate the mode in the above block. If left or block is currently not available, leftIntraDir or aboveIntraDir will be set to DC_IDX. In addition, variable "offset" and "mod" are the constant values, which are set to 29 and 32 respectively.

```
If (leftIntraDir == aboveIntraDir && leftIntraDir > DC_IDX)
    MPM [0] = leftIntraDir;
    MPM [1] = ((leftIntraDir + offset) % mod) + 2;
    MPM [2] = ((leftIntraDir − 1) % mod) + 2;
Else if (leftIntraDir == aboveIntraDir)
    MPM [0] = PLANAR_IDX;
    MPM [1] = DC_IDX;
    MPM [2] = VER_IDX;
Else if (leftIntraDir != aboveIntraDir)
    MPM [0] = leftIntraDir;
    MPM [1] = aboveIntraDir;
    If (leftIntraDir > 0 && aboveIntraDir > 0)
        MPM [2] = PLANAR_IDX;
    Else
        MPM [2] = (leftIntraDir + aboveIntraDir) < 2 ? VER_IDX :
        DC_IDX;
```

Figure 7:
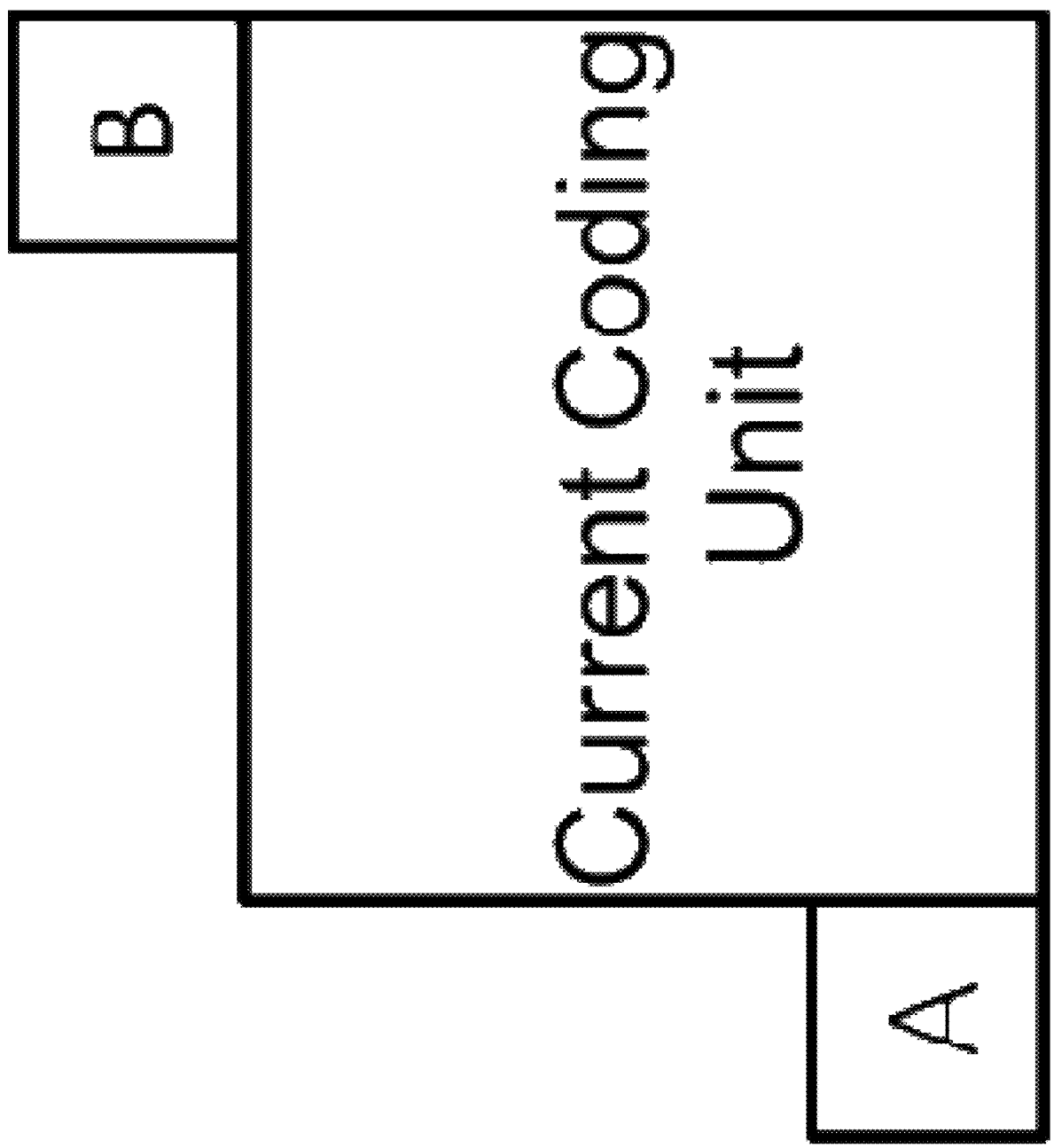
FIG. 7 illustrates positions of neighboring CUs, according to an embodiment.

In VTM-3.0, the size of MPM list is set equal to 6 for both the adjacent reference line (also referred to zero reference line) and non-adjacent reference lines (also referred to non-zero reference lines). The positions of neighboring modes used to derive 6 MPM candidates are also the same for adjacent and non-adjacent reference lines, which is illustrated in FIG. 7. In FIG. 7, the block A denotes the left neighboring coding unit of current coding unit, block B denotes the above neighboring coding unit of current coding unit, and variables candIntraPredModeA and candIntraPredModeB indicate the associated intra prediction modes of block A and B respectively. candIntraPredModeA and candIntraPredModeB are initially set equal to INTRA_PLANAR. If block A (or B) is marked as available, candIntraPredModeA (or candIntraPredModeB) is set equal to the actual intra prediction mode of block A (or B).

MPM candidate derivation process may be different for the adjacent and non-adjacent reference lines. For the zero reference line, if both two neighboring modes are Planar or DC mode, default modes may be used to construct the MPM list, 2 of them are Planar and DC modes, and the remaining 4 modes are angular modes (also referred to angular default modes). For non-zero reference lines, if both two neighboring modes are Planar or DC mode, 6 angular default modes are used to construct the MPM list. An example of an MPM list derivation process is shown below, wherein candModeList[x] with x=0..5 denotes the 6 MPM candidates, IntraLumaRefLineIdx[xCb][yCb] denotes the reference line index of the block to be predicted, and IntraLumaRefLineIdx[xCb][yCb] can be 0,1, or 3.

- If candIntraPredModeB is equal to candIntraPredModeA and candIntraPredModeA is greater than INTRA_DC, candModeList[ x ] with x = 0..5 is derived as follows:
    - If IntraLumaRefLineIdx[ xCb ][ yCb ] is equal to 0, the following applies:
        candModeList[ 0 ] = candIntraPredModeA
        candModeList[ 1 ] = INTRA_PLANAR
        candModeList[ 2 ] = INTRA_DC
        candModeList[ 3 ] = 2 + ( ( candIntraPredModeA + 61 ) % 64 )
        candModeList[ 4 ] = 2 + ( ( candIntraPredModeA − 1 ) % 64 )
        candModeList[ 5 ] = 2 + ( ( candIntraPredModeA + 60 ) % 64 )
    - Otherwise (IntraLumaRefLineIdx[ xCb ][ yCb ] is not equal to 0), the following applies:
        candModeList[ 0 ] = candIntraPredModeA
        candModeList[ 1 ] = 2 + ( ( candIntraPredModeA + 61 ) % 64 )
        candModeList[ 2 ] = 2 + ( ( candIntraPredModeA − 1 ) % 64 )
        candModeList[ 3 ] = 2 + ( ( candIntraPredModeA + 60 ) % 64 )
        candModeList[ 4 ] = 2 + ( candIntraPredModeA % 64 )
        candModeList[ 5 ] = 2 + ( ( candIntraPredModeA + 59 ) % 64 )
- Otherwise if candIntraPredModeB is not equal to candIntraPredModeA and candIntraPredModeA or candIntraPredModeB is greater than INTRA_DC, the following applies:
    - The variables minAB and maxAB are derived as follows:
        minAB = candModeList[ (candModeList[ 0 ] > candModeList[ 1 ]) ? 1 : 0 ]
        maxAB = candModeList[ (candModeList[ 0 ] > candModeList[ 1 ]) ? 0 : 1 ]
    - If candIntraPredModeA and candIntraPredModeB are both greater than INTRA_DC, candModeList[ x ] with x = 0..5 is derived as follows:
        candModeList[ 0 ] = candIntraPredModeA
        candModeList[ 1 ] = candIntraPredModeB
        - If IntraLumaRefLineIdx[ xCb ][ yCb ] is equal to 0, the following applies:
            candModeList[ 2 ] = INTRA_PLANAR
            candModeList[ 3 ] = INTRA_DC
        - If maxAB − minAB is in the range of 2 to 62, inclusive, the following applies:
            candModeList[ 4 ] = 2 + ( ( maxAB + 61 ) % 64 )
            candModeList[ 5 ] = 2 + ( ( maxAB − 1 ) % 64 )
            - Otherwise, the following applies:
                candModeList[ 4 ] = 2 + ( ( maxAB + 60 ) % 64 )
                candModeList[ 5 ] = 2 + ( ( maxAB ) % 64 )
        - Otherwise (IntraLumaRefLineIdx[ xCb ][ yCb ] is not equal to 0), the following applies:
            - If maxAB − minAB is equal to 1, the following applies:
                candModeList[ 2 ] = 2 + ( ( minAB + 61 ) % 64 )
                candModeList[ 3 ] = 2 + ( ( maxAB − 1 ) % 64 )
                candModeList[ 4 ] = 2 + ( ( minAB + 60 ) % 64 )
                candModeList[ 5 ] = 2 + ( maxAB % 64 )
            - Otherwise if maxAB − minAB is equal to 2, the following applies:
                candModeList[ 2 ] = 2 + ( ( minAB − 1 ) % 64 )
                candModeList[ 3 ] = 2 + ( ( minAB + 61 ) % 64 )
                candModeList[ 4 ] = 2 + ( ( maxAB − 1 ) % 64 )
                candModeList[ 5 ] = 2 + ( ( minAB + 60 ) % 64 )
            - Otherwise if maxAB − minAB is greater than 61, the following applies:
                candModeList[ 2 ] = 2 + ( ( minAB − 1 ) % 64 )
                candModeList[ 3 ] = 2 + ( ( maxAB + 61 ) % 64 )
                candModeList[ 4 ] = 2 + ( minAB % 64 )
                candModeList[ 5 ] = 2 + ( ( maxAB + 60 ) % 64 )
            - Otherwise, the following applies:
                candModeList[ 2 ] = 2 + ( ( minAB + 61 ) % 64 )
                candModeList[ 3 ] = 2 + ( ( minAB − 1 ) % 64 )
                candModeList[ 4 ] = 2 + ( ( maxAB + 61 ) % 64 )
                candModeList[ 5 ] = 2 + ( ( maxAB − 1 ) % 64 )
    - Otherwise (candIntraPredModeA or candIntraPredModeB is greater than INTRA_DC), candModeList[ x ] with x = 0..5 is derived as follows:
        - If IntraLumaRefLineIdx[ xCb ][ yCb ] is equal to 0, the following applies:
            candModeList[ 0 ] = candIntraPredModeA
            candModeList[ 1 ] = candIntraPredModeB
            candModeList[ 2 ] = 1 − minAB
            candModeList[ 3 ] = 2 + ( ( maxAB + 61 ) % 64 )
            candModeList[ 4 ] = 2 + ( ( maxAB − 1 ) % 64 )
            candModeList[ 5 ] = 2 + ( ( maxAB + 60 ) % 64 )

- Otherwise (IntraLumaRefLineIdx[ xCb ][ yCb ] is not equal to 0), the following applies:
    - candModeList[ 0 ] = maxAB
    - candModeList[ 1 ] = 2 + ( ( maxAB + 61 ) % 64 )
    - candModeList[ 2 ] = 2 + ( ( maxAB − 1 ) % 64 )
    - candModeList[ 3 ] = 2 + ( ( maxAB + 60 ) % 64 )
    - candModeList[ 4 ] = 2 + ( maxAB % 64 )
    - candModeList[ 5 ] = 2 + ( ( maxAB + 59 ) % 64 )
- Otherwise, the following applies:
  - If IntraLumaRefLineIdx[ xCb ][ yCb ] is equal to 0, the following applies:
    - candModeList[ 0 ] = candIntraPredModeA
    - candModeList[ 1 ] = ( candModeList[0] = = INTRA_PLANAR ) ? INTRA_DC : INTRA_PLANAR
    - candModeList[ 2 ] = INTRA_ANGULAR50
    - candModeList[ 3 ] = INTRA_ANGULAR18
    - candModeList[ 4 ] = INTRA_ANGULAR46
    - candModeList[ 5 ] = INTRA_ANGULAR54
  - Otherwise (IntraLumaRefLineIdx[ xCb ][ yCb ] is not equal to 0), the following applies:
    - candModeList[ 0 ] = INTRA_ANGULAR50
    - candModeList[ 1 ] = INTRA_ANGULAR18
    - candModeList[ 2 ] = INTRA_ANGULAR2
    - candModeList[ 3 ] = INTRA_ANGULAR34
    - candModeList[ 4 ] = INTRA_ANGULAR66
    - candModeList[ 5 ] = INTRA_ANGULAR26

Figure 8:
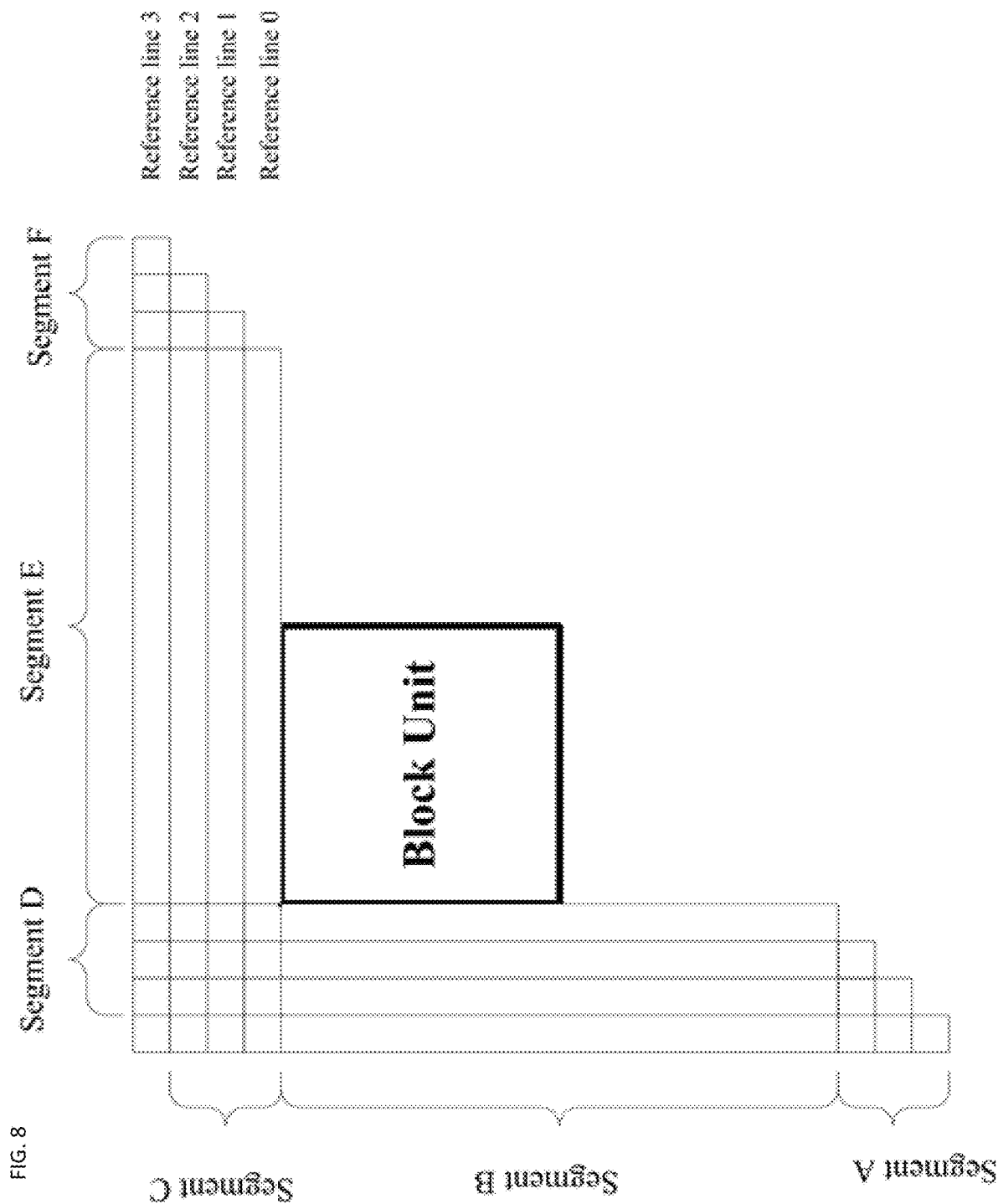
FIG. 8 illustrates an example of reference lines used in multi-line intra prediction, according to an embodiment.

Multi-line intra prediction was proposed to use more reference lines for intra prediction, and encoder decides and signals which reference line is used to generate the intra predictor. In examples of multi-line intra prediction, a reference line index may be signaled before intra prediction modes, and only the most probable modes are allowed in case a nonzero reference line index is signaled. In FIG. 8, an example of 4 reference lines is depicted, where each reference line is composed of six segments, i.e., Segment A to F, together with the top-left reference sample. In addition, Segment A and F are padded with the closest samples from Segment B and E, respectively.

Position dependent intra prediction combination (PDPC) may be applied to the following intra modes without signaling: planar, DC, WAIP modes, horizontal, vertical, bottom-left angular mode (mode 2) and its 8 adjacent angular modes (mode 3-10), and top-right angular mode (mode 66) and its 8 adjacent angular modes (mode 58-65).

In examples of PDPC, a prediction sample pred (x,y) located at position (x, y) is predicted using an intra prediction mode (DC, planar, angular) and a linear combination of reference samples according to the PDPC expression shown in Equation 5 below:

$$\text{pred}(x,y) = (wL \times R_{-1,y} + wT \times R_{x,-1} - wTL \times R_{-1,-1} + (64 - wL - wT + wTL) \times \text{pred}(x,y) + 32) \quad \text{(Equation 5)}$$

where $R_{x,-1}$, $R_{-1,y}$ represent reference samples located at the top and left of current sample (x, y), respectively, and $R_{-1,-1}$ represents the reference sample located at the top-left corner of the current block.

For the DC mode the weights are calculated as follows for a block with dimensions width and height as shown in Equation 6 below:

$$wT = 32 \gg ((y \ll 1) \gg n\text{Scale}), \; wL = 32 \gg ((x \ll 1) \gg n\text{Scale}),$$
$$wTL = (wL \gg 4) + (wT \gg 4) \quad \text{(Equation 6)}$$

with $n\text{Scale} = (\log 2(\text{width}) - 2 + \log 2 (\text{height}) - 2 + 2) \gg 2$, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor For planar mode wTL=0, while for horizontal mode wTL=wT and for vertical mode wTL=wL. The PDPC weights can be calculated with adds and shifts only. The value of pred(x,y) can be computed in a single step using Equation 5.

Figure 9A:
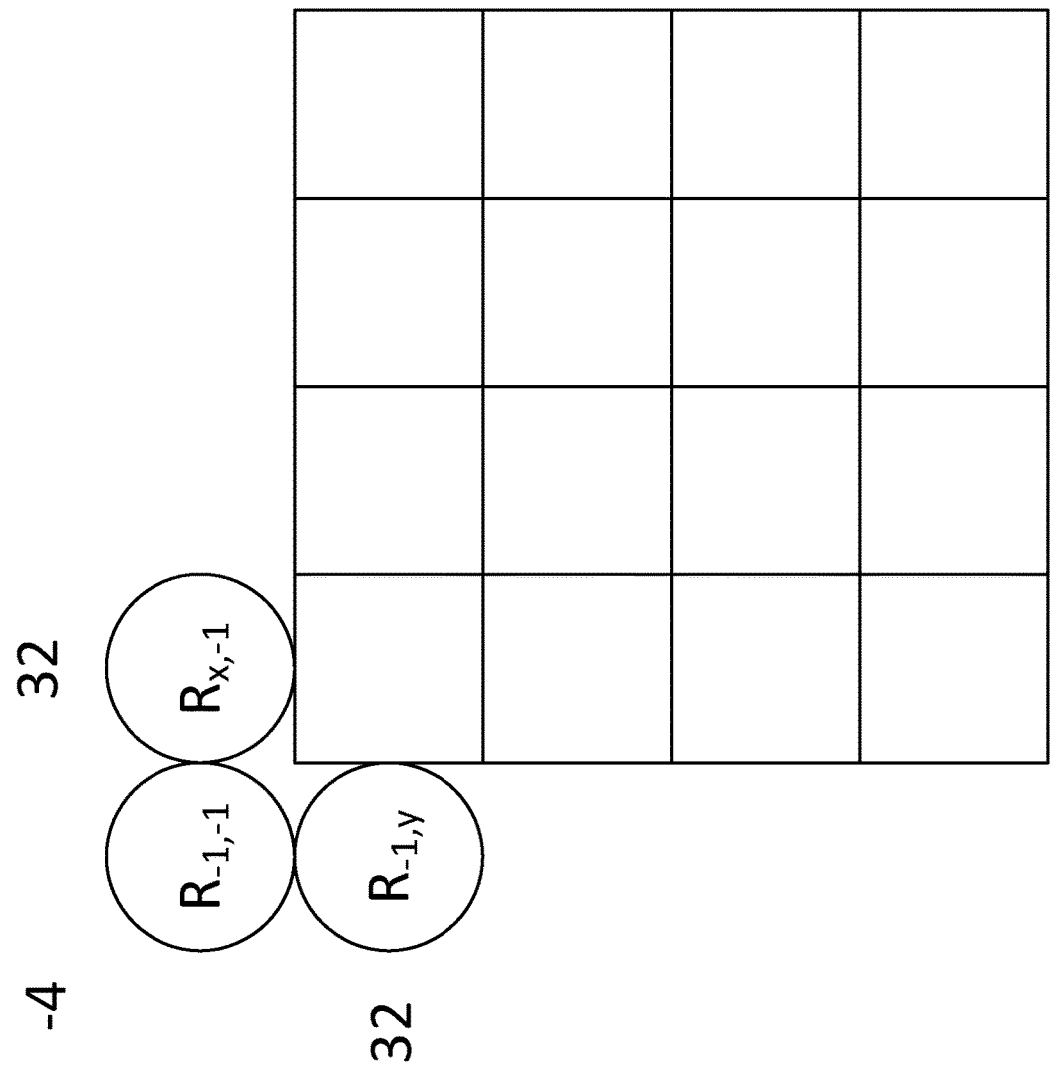
FIGS. 9A-9B illustrate examples of PDPC weights for sample positions (0,0) and (1,0) inside a 4×4 block.
Figure 9B:
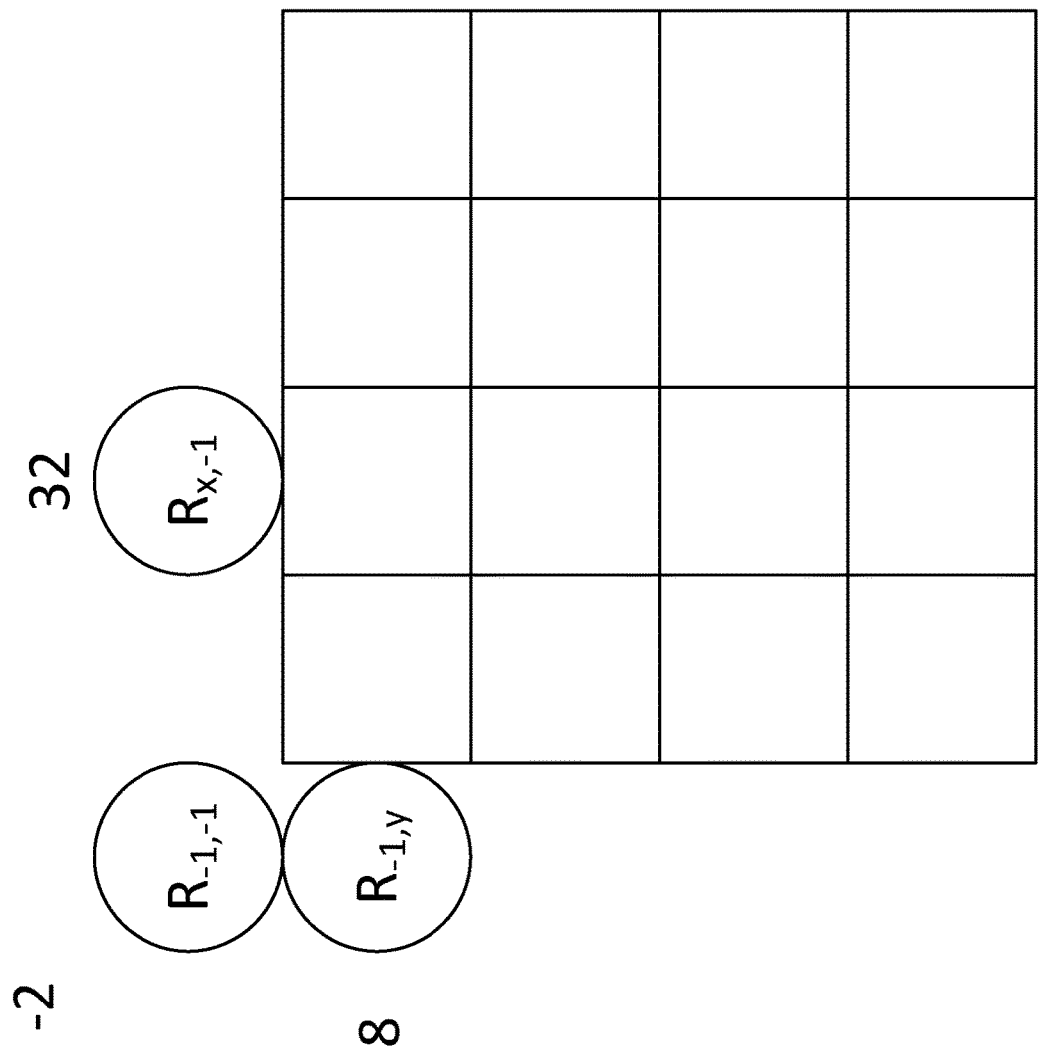

FIG. 9A illustrates DC mode PDPC weights (wL, wT, wTL) for (0, 0) position inside one 4×4 block, and FIG. 9B illustrates DC mode PDPC weights (wL, wT, wTL) for (1, 0) position inside one 4×4 block.

If PDPC is applied to DC, planar, horizontal, and vertical intra modes, additional boundary filters are not needed, such as the HEVC DC mode boundary filter or horizontal/vertical mode edge filters.

FIG. 9A illustrates an example of the definition of reference samples $R_{x,-1}$, $R_{-1,y}$ and $R_{-1,-1}$ for PDPC applied to the top-right diagonal mode. The prediction sample pred(x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

Figure 10:
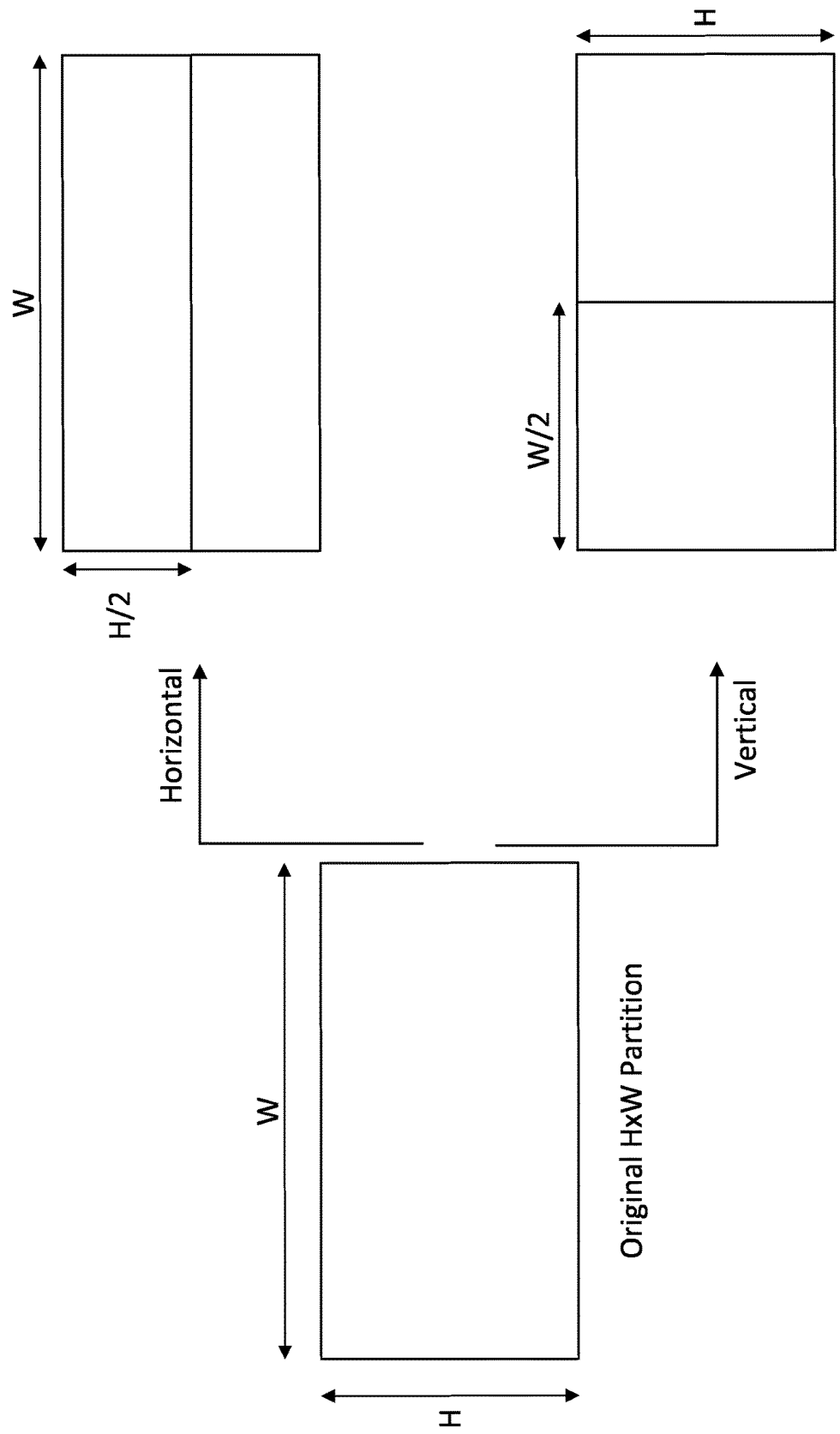
FIG. 10 shows an example of division of 4×8 and 8×4 blocks, according to an embodiment.
Figure 11:
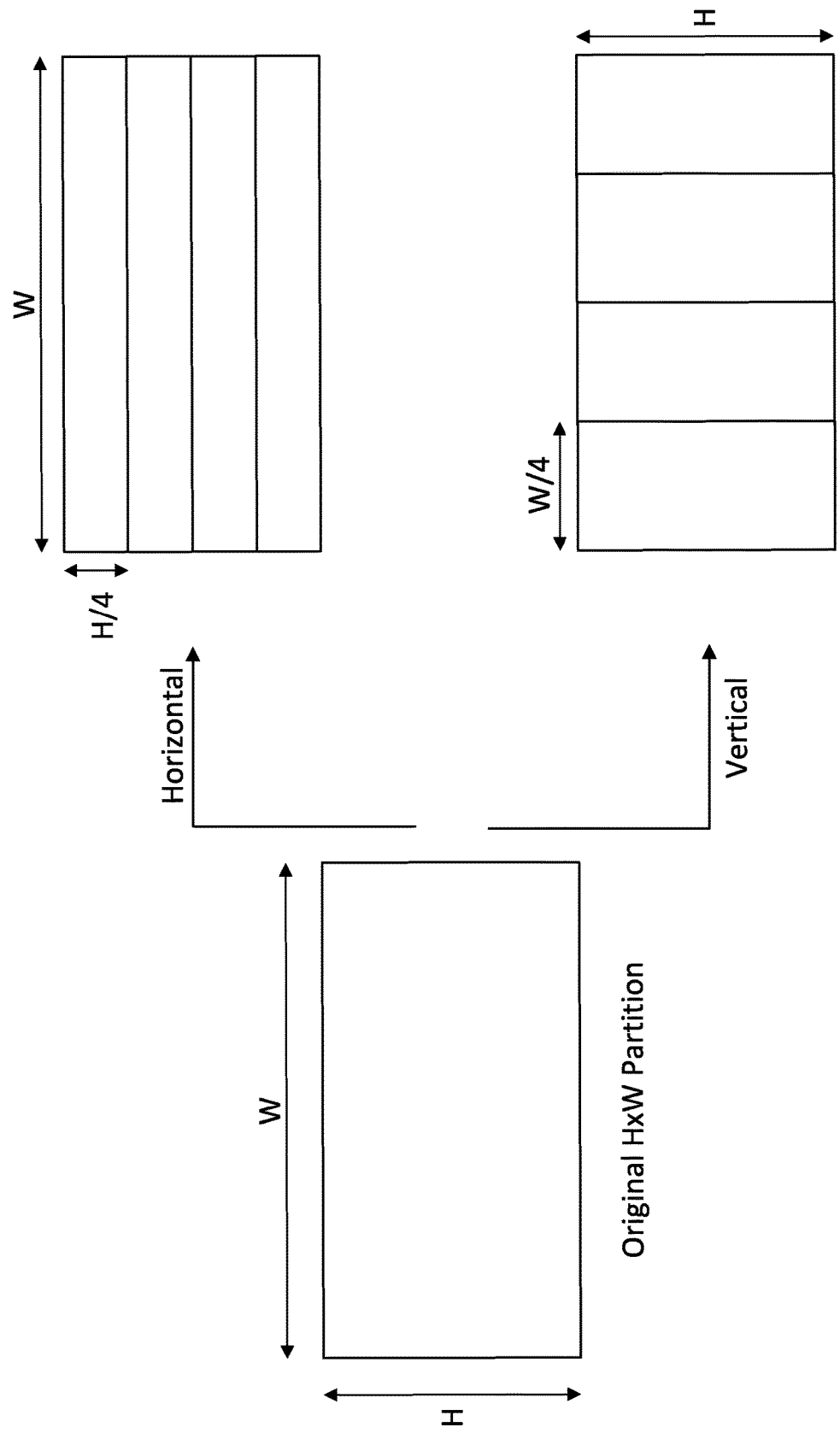
FIG. 11 shows an example of division of all blocks except 4×8, 8×4 and 4×4 blocks, according to an embodiment.

According to an embodiment, an Intra Sub-Partitions (ISP) coding mode divides luma intra-predicted blocks vertically or horizontally into 2 or 4 sub-partitions depending on the block size dimensions, as shown in Table 1. FIG. 10 and FIG. 11 show examples of the two possibilities. For example, FIG. 10 shows an example of division of 4×8 and 8×4 blocks, according to an embodiment. As another example, FIG. 11 shows an example of division of all blocks except 4×8, 8×4 and 4×4 blocks, according to an embodiment. All sub-partitions shown in FIG. 10 and FIG. 11 fulfill the condition of having at least 16 samples.

TABLE 1

Number of sub-partitions depending on the block size

| Block Size | Number of Sub-Partitions |
| --- | --- |
| 4 × 4 | Not divided |
| 4 × 8 and 8 × 4 | 2 |
| All other cases | 4 |

For each of these sub-partitions, a residual signal may be generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

The ISP algorithm will only be tested with intra modes that are part of the MPM list. For this reason, if a block uses ISP, then the MPM flag will be inferred to be one. Besides, if ISP is used for a certain block, then the MPM list will be modified to exclude the DC mode and to prioritize horizontal intra modes for the ISP horizontal split and vertical intra modes for the vertical one.

Figure 12:
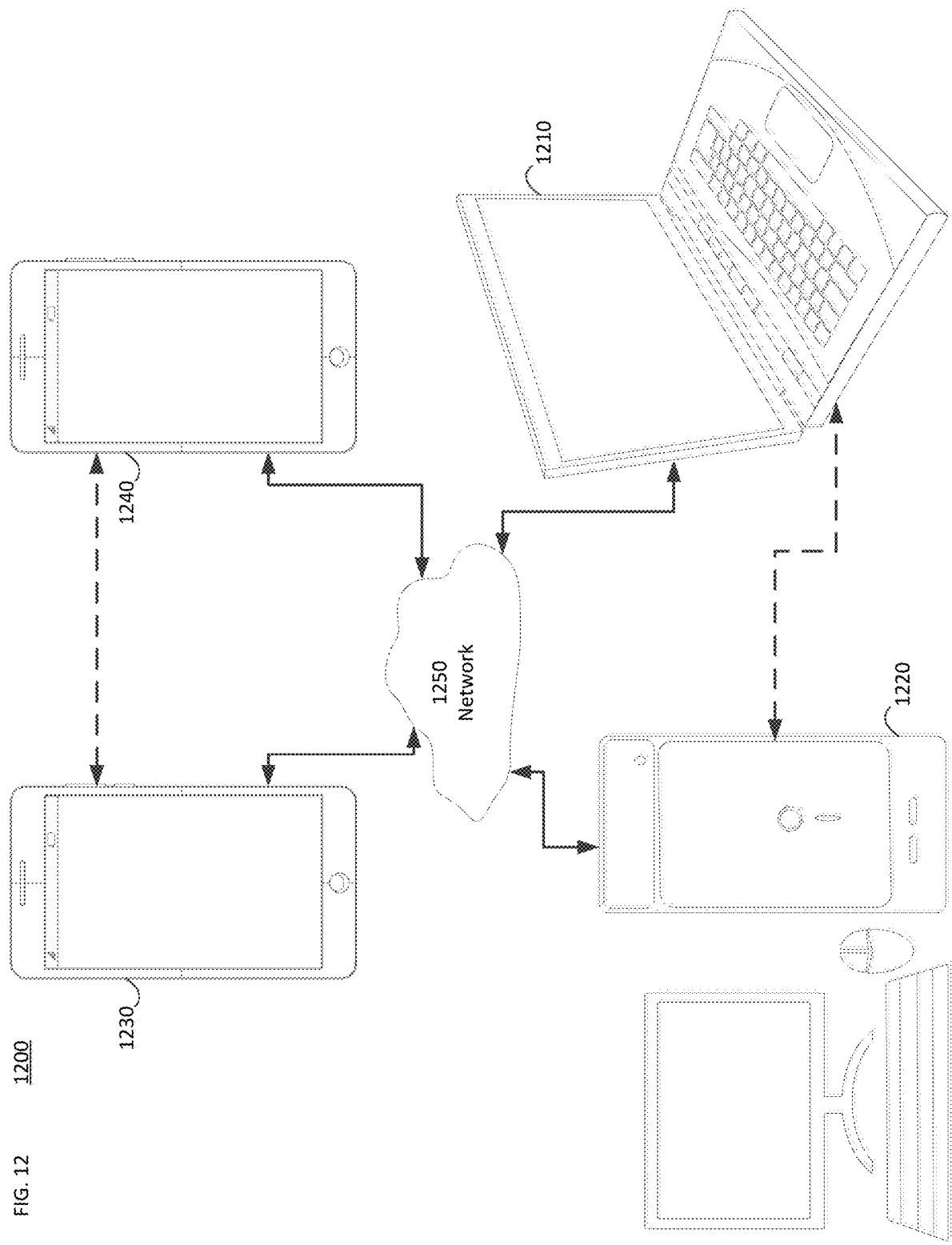
FIG. 12 is a simplified block diagram of a communication system according to an embodiment of the present disclosure.

FIG. 12 illustrates a simplified block diagram of a communication system (1200) according to an embodiment of the present disclosure. The communication system (1200) may include at least two terminals (1210-1220) interconnected via a network (1250). For unidirectional transmission of data, a first terminal (1210) may code video data at a local location for transmission to the other terminal (1220) via the network (1250). The second terminal (1220) may receive the coded video data of the other terminal from the network (1250), decode the coded data and display the recovered video data. Unidirectional data transmission may be common in media serving applications and the like.

FIG. 12 illustrates a second pair of terminals (1230, 1240) provided to support bidirectional transmission of coded video that may occur, for example, during videoconferencing. For bidirectional transmission of data, each terminal (1230, 1240) may code video data captured at a local location for transmission to the other terminal via the network (1250). Each terminal (1230, 1240) also may receive the coded video data transmitted by the other terminal, may decode the coded data and may display the recovered video data at a local display device.

In FIG. 12, the terminals (1210-1240) may be illustrated as servers, personal computers and smart phones but the principles of the present disclosure are not so limited. Embodiments of the present disclosure find application with laptop computers, tablet computers, media players and/or dedicated video conferencing equipment. The network (1250) represents any number of networks that convey coded video data among the terminals (1210-1240), including for example wireline and/or wireless communication networks. The communication network (1250) may exchange data in circuit-switched and/or packet-switched channels. Representative networks include telecommunications networks, local area networks, wide area networks and/or the Internet. For the purposes of the present discussion, the architecture and topology of the network (1250) may be immaterial to the operation of the present disclosure unless explained herein below.

Figure 13:
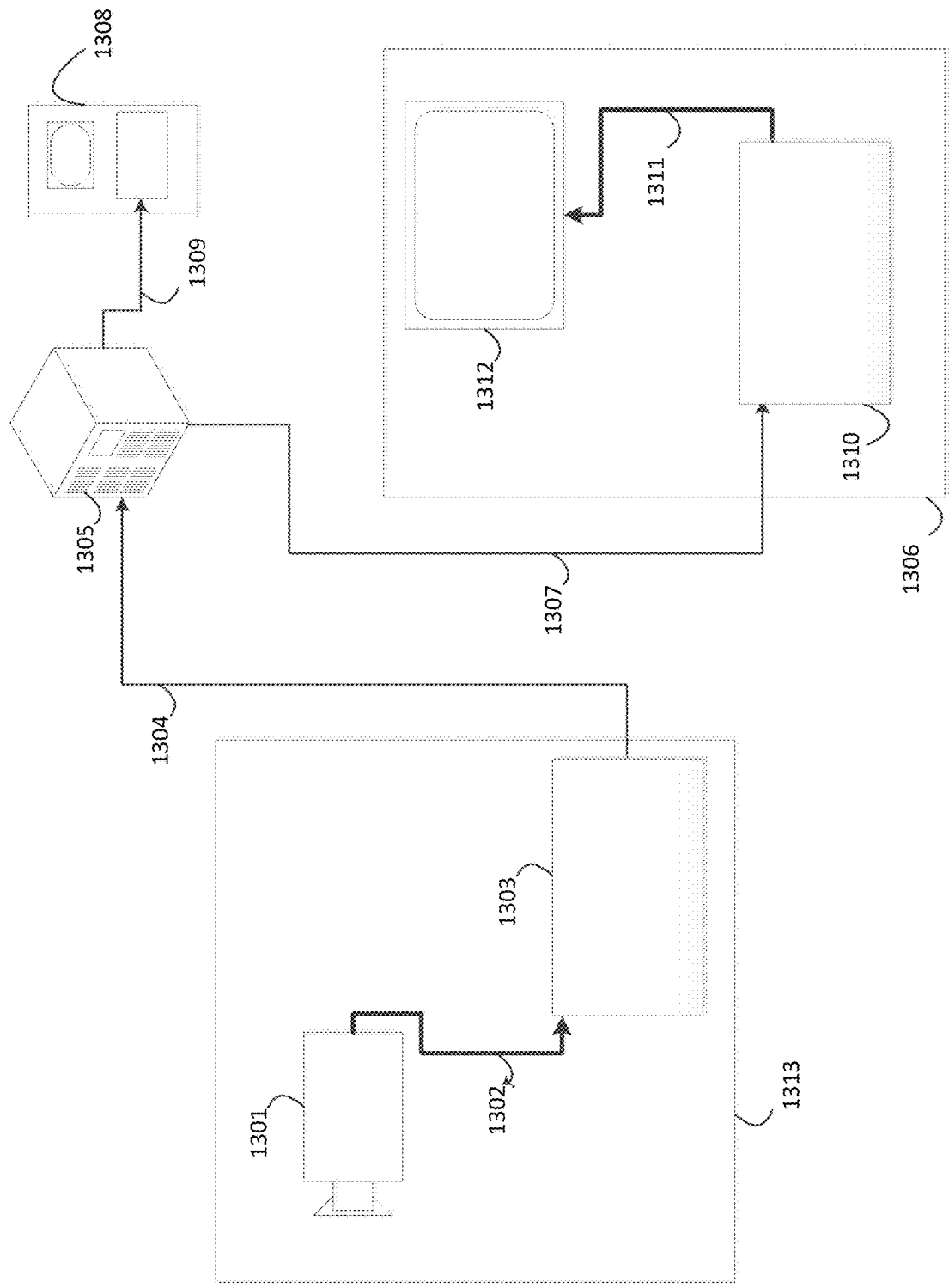
FIG. 13 is a diagram of the placement of a video encoder and decoder in a streaming environment.

FIG. 13 illustrates, as an example for an application for the disclosed subject matter, the placement of a video encoder and decoder in a streaming environment, for example streaming system 300. The disclosed subject matter can be equally applicable to other video enabled applications, including, for example, video conferencing, digital TV, storing of compressed video on digital media including CD, DVD, memory stick and the like, and so on.

A streaming system may include a capture subsystem (1313), that can include a video source (1301), for example a digital camera, creating, for example, an uncompressed video sample stream (1302). That sample stream (1302), depicted as a bold line to emphasize a high data volume when compared to encoded video bitstreams, can be processed by an encoder (1303) coupled to the camera 1301). The encoder (1303) can include hardware, software, or a combination thereof to enable or implement aspects of the disclosed subject matter as described in more detail below. The encoded video bitstream (1304), depicted as a thin line to emphasize the lower data volume when compared to the sample stream, can be stored on a streaming server (1305) for future use. One or more streaming clients (1306, 1308) can access the streaming server (1305) to retrieve copies (1307, 1309) of the encoded video bitstream (1304). A client (1306) can include a video decoder (1310) which decodes the incoming copy of the encoded video bitstream (1307) and creates an outgoing video sample stream (1311) that can be rendered on a display (1312) or other rendering device (not depicted). In some streaming systems, the video bitstreams (1304, 1307, 1309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 14:
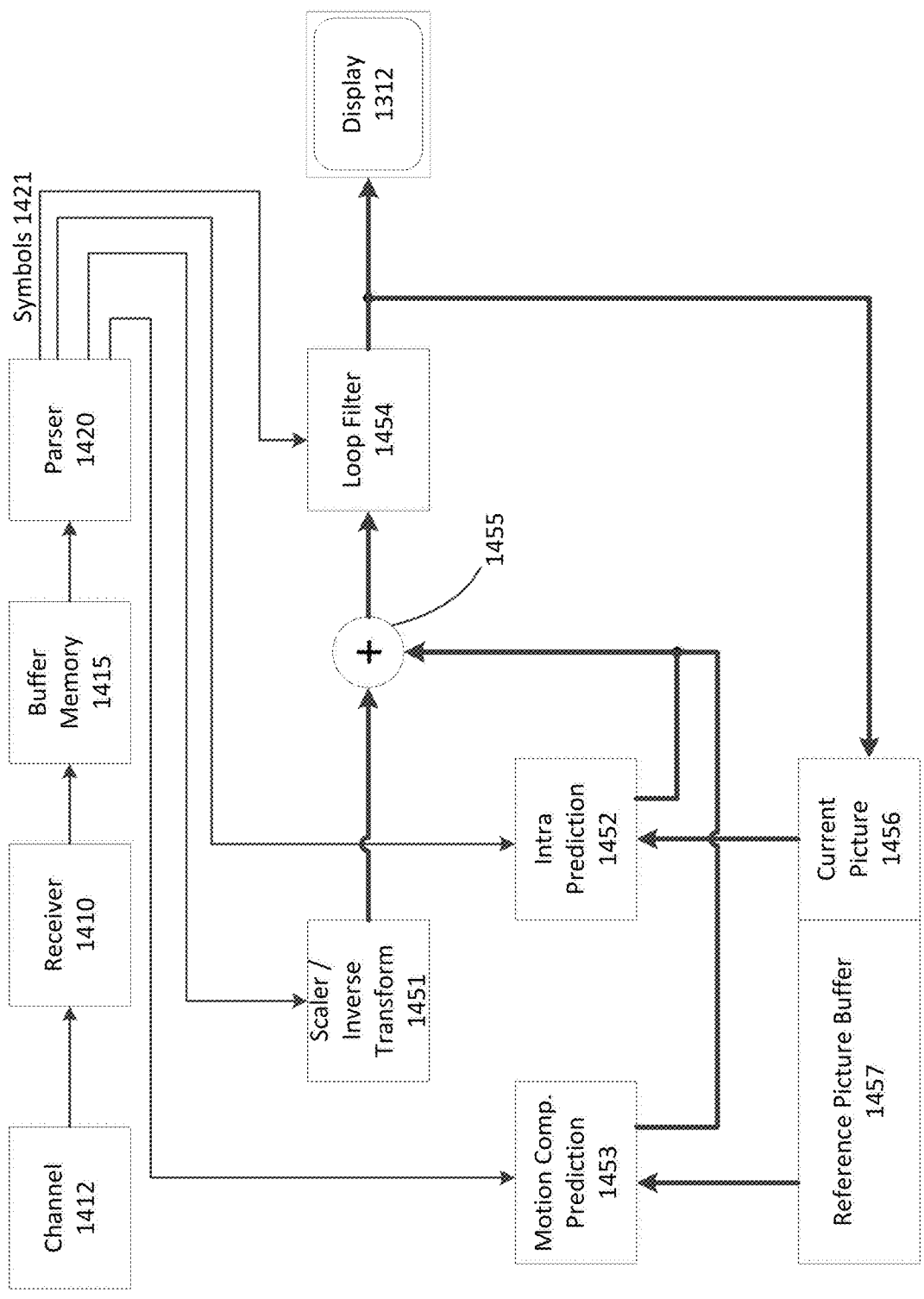
FIG. 14 is a functional block diagram of a video decoder according to an embodiment of the present disclosure.

FIG. 14 may be a functional block diagram of a video decoder (1310) according to an embodiment of the present invention.

A receiver (1410) may receive one or more codec video sequences to be decoded by the decoder (1310); in the same or another embodiment, one coded video sequence at a time, where the decoding of each coded video sequence is independent from other coded video sequences. The coded video sequence may be received from a channel (1412), which may be a hardware/software link to a storage device which stores the encoded video data. The receiver (1410) may receive the encoded video data with other data, for example, coded audio data and/or ancillary data streams, that may be forwarded to their respective using entities (not depicted). The receiver (1410) may separate the coded video sequence from the other data. To combat network jitter, a buffer memory (1415) may be coupled in between receiver (1410) and entropy decoder/parser (1420) ("parser" henceforth). When receiver (1410) is receiving data from a store/forward device of sufficient bandwidth and controllability, or from an isosychronous network, the buffer (1415) may not be needed, or can be small. For use on best effort packet networks such as the Internet, the buffer (1415) may be required, can be comparatively large and can advantageously of adaptive size.

The video decoder (1310) may include a parser (1420) to reconstruct symbols (1421) from the entropy coded video sequence. Categories of those symbols include information used to manage operation of the decoder (1310), and potentially information to control a rendering device such as a display (1312) that is not an integral part of the decoder but can be coupled to it, as was shown in FIG. 14. The control information for the rendering device(s) may be in the form of Supplementary Enhancement Information (SEI messages) or Video Usability Information (VUI) parameter set fragments (not depicted). The parser (1420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (1420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (1420) may perform entropy decoding/parsing operation on the video sequence received from the buffer (1415), so to create symbols (1421). The parser (1420) may receive encoded data, and selectively decode particular symbols (1421). Further, the parser (1420) may determine whether the particular symbols (1421) are to be provided to a Motion Compensation Prediction unit (1453), a scaler/inverse transform unit (1451), an Intra Prediction Unit (1452), or a loop filter (1456).

Reconstruction of the symbols (1421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (1420). The flow of such subgroup control information between the parser (1420) and the multiple units below is not depicted for clarity.

Beyond the functional blocks already mentioned, decoder (1310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (1451). The scaler/inverse transform unit (1451) receives quantized transform coefficient as well as control information, including which transform to use, block size, quantization factor, quantization scaling matrices, etc. as symbol(s) (1421) from the parser (1420). It can output blocks comprising sample values, that can be input into aggregator (1455).

In some cases, the output samples of the scaler/inverse transform (1451) can pertain to an intra coded block; that is: a block that is not using predictive information from previously reconstructed pictures, but can use predictive information from previously reconstructed parts of the current picture. Such predictive information can be provided by an intra picture prediction unit (1452). In some cases, the intra picture prediction unit (1452) generates a block of the same size and shape of the block under reconstruction, using surrounding already reconstructed information fetched from the current (partly reconstructed) picture (1458). The aggregator (1455), in some cases, adds, on a per sample basis, the prediction information the intra prediction unit (1452) has generated to the output sample information as provided by the scaler/inverse transform unit (1451).

In other cases, the output samples of the scaler/inverse transform unit (1451) can pertain to an inter coded, and potentially motion compensated block. In such a case, a Motion Compensation Prediction unit (1453) can access reference picture memory (1457) to fetch samples used for prediction. After motion compensating the fetched samples in accordance with the symbols (1421) pertaining to the block, these samples can be added by the aggregator (1455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (1421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (1455) can be subject to various loop filtering techniques in the loop filter unit (1454). Video compression technologies can include in-loop filter technologies that are controlled by parameters included in the coded video bitstream and made available to the loop filter unit (1454) as symbols (1421) from the parser (1420), but can also be responsive to meta-information obtained during the decoding of previous (in decoding order) parts of the coded picture or coded video sequence, as well as responsive to previously reconstructed and loop-filtered sample values.

The output of the loop filter unit (1454) can be a sample stream that can be output to the render device (1312) as well as stored in the reference picture memory (1456) for use in future inter-picture prediction.

Certain coded pictures, once fully reconstructed, can be used as reference pictures for future prediction. Once a coded picture is fully reconstructed and the coded picture has been identified as a reference picture (by, for example, parser (1420)), the current reference picture (1458) can become part of the reference picture buffer (1457), and a fresh current picture memory can be reallocated before commencing the reconstruction of the following coded picture.

The video decoder (1310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (1410) may receive additional (redundant) data with the encoded video. The additional data may be included as part of the coded video sequence(s). The additional data may be used by the video decoder (1310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 15:
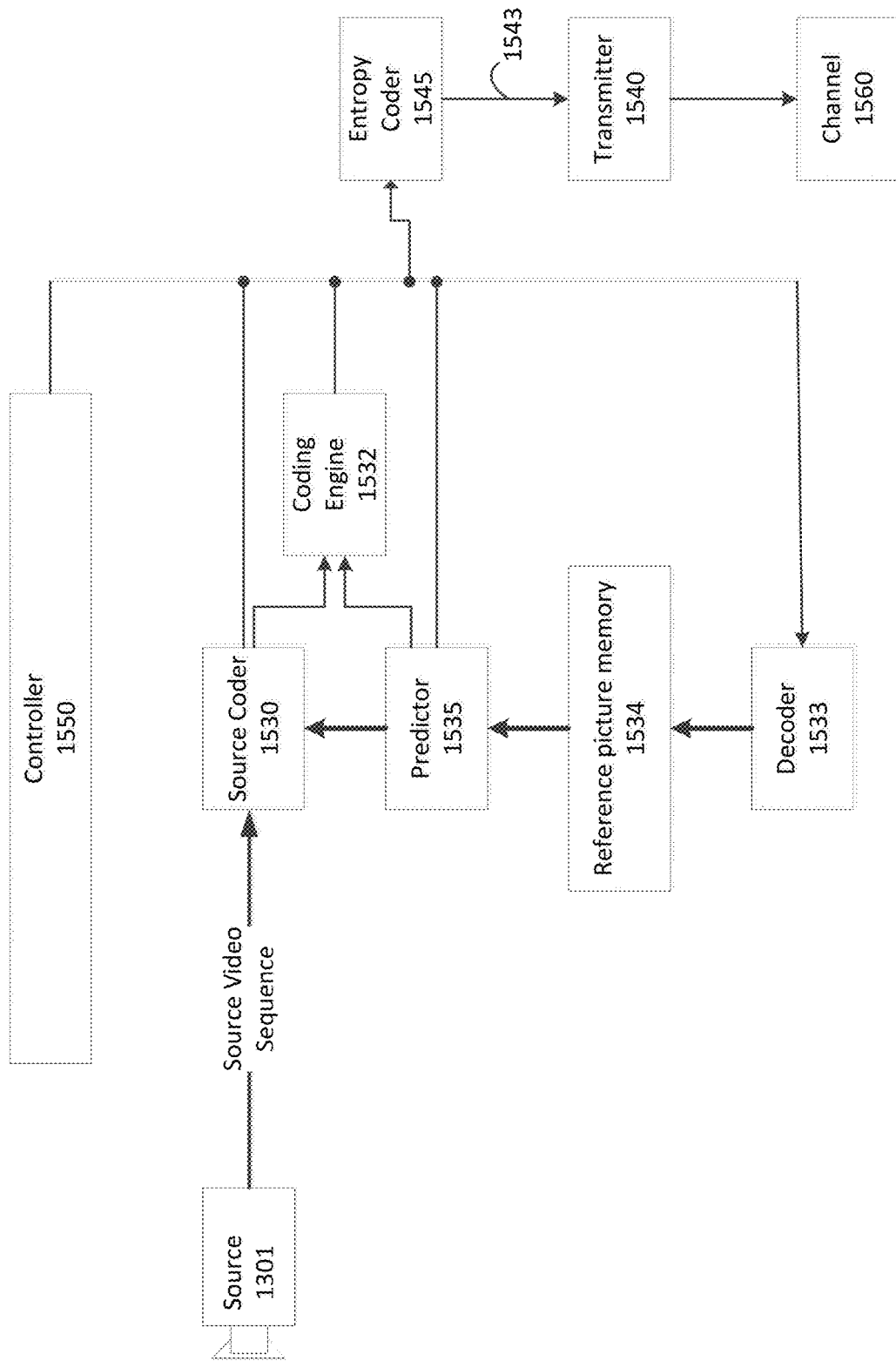
FIG. 15 is a functional block diagram of a video encoder according to an embodiment of the present disclosure.

FIG. 15 may be a functional block diagram of a video encoder (1303) according to an embodiment of the present disclosure.

The encoder (1303) may receive video samples from a video source (1301) (that is not part of the encoder) that may capture video image(s) to be coded by the encoder (1303).

The video source (1301) may provide the source video sequence to be coded by the encoder (1303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (1301) may be a storage device storing previously prepared video. In a videoconferencing system, the video source (1303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (1303) may code and compress the pictures of the source video sequence into a coded video sequence (1543) in real time or under any other time constraints as required by the application. Enforcing appropriate coding speed is one function of Controller (1550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (1550) as they may pertain to video encoder (1303) optimized for a certain system design.

Some video encoders operate in what a person skilled in the art readily recognizes as a "coding loop." As an oversimplified description, a coding loop can consist of the encoding part of an encoder (1530) ("source coder" henceforth) (responsible for creating symbols based on an input picture to be coded, and a reference picture(s)), and a (local) decoder (1533) embedded in the encoder (1303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (1534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (1533) can be the same as of a "remote" decoder (1310), which has already been described in detail above in conjunction with FIG. 14. Briefly referring also to FIG. 15, however, as symbols are available and en/decoding of symbols to a coded video sequence by entropy coder (1545) and parser (1420) can be lossless, the entropy decoding parts of decoder (1310), including channel (1412), receiver (1410), buffer (1415), and parser (1420) may not be fully implemented in local decoder (1533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (1530) may perform motion compensated predictive coding, which codes an input frame predictively with reference to one or more previously-coded frames from the video sequence that were designated as "reference frames." In this manner, the coding engine (1532) codes differences between pixel blocks of an input frame and pixel blocks of reference frame(s) that may be selected as prediction reference(s) to the input frame.

The local video decoder (1533) may decode coded video data of frames that may be designated as reference frames, based on symbols created by the source coder (1530). Operations of the coding engine (1532) may advantageously be lossy processes. When the coded video data may be decoded at a video decoder (not shown in FIG. 15), the reconstructed video sequence typically may be a replica of the source video sequence with some errors. The local video decoder (1533) replicates decoding processes that may be performed by the video decoder on reference frames and may cause reconstructed reference frames to be stored in the reference picture cache (1534). In this manner, the encoder (1303) may store copies of reconstructed reference frames locally that have common content as the reconstructed reference frames that will be obtained by a far-end video decoder (absent transmission errors).

The predictor (1535) may perform prediction searches for the coding engine (1532). That is, for a new frame to be coded, the predictor (1535) may search the reference picture memory (1534) for sample data (as candidate reference pixel blocks) or certain metadata such as reference picture motion vectors, block shapes, and so on, that may serve as an appropriate prediction reference for the new pictures. The predictor (1535) may operate on a sample block-by-pixel block basis to find appropriate prediction references. In some cases, as determined by search results obtained by the predictor (1535), an input picture may have prediction references drawn from multiple reference pictures stored in the reference picture memory (1534).

The controller (1550) may manage coding operations of the video coder (1530), including, for example, setting of parameters and subgroup parameters used for encoding the video data.

Output of all aforementioned functional units may be subjected to entropy coding in the entropy coder (1545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (1540) may buffer the coded video sequence(s) as created by the entropy coder (1545) to prepare it for transmission via a communication channel (1560), which may be a hardware/software link to a storage device which would store the encoded video data. The transmitter (1540) may merge coded video data from the video coder (1530) with other data to be transmitted, for example, coded audio data and/or ancillary data streams (sources not shown).

The controller (1550) may manage operation of the encoder (1303). During coding, the controller (1550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (1303) may perform coding operations according to a predetermined video coding technology or standard, such as ITU-T Rec. H.265. In its operation, the video coder (1303) may perform various compression operations, including predictive coding operations that exploit temporal and spatial redundancies in the input video sequence. The coded video data, therefore, may conform to a syntax specified by the video coding technology or standard being used.

In an embodiment, the transmitter (1540) may transmit additional data with the encoded video. The video coder (1530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Throughout the present disclosure, CCLM may refer to the single model CCLM described above, or multi-model CCLM proposed in, for example, JVET-L0251, or multi-direction CCLM described in JVET-L0340.

In VTM-3.0, when CIP is enabled, if any of the above neighboring reference samples come from a block is not intra coded, then the entire above reference row is marked as unavailable and not considered for deriving the parameters of CCLM. Similarly, in VTM-3.0 when CIP is enabled, if any of the left neighboring reference samples come from a block is not intra coded, then the entire left reference column is marked as unavailable and not considered for deriving the parameters of CCLM. Therefore, there can be neighboring samples that are intra coded but not utilized for deriving the parameters of CCLM, which is a limitation of the coding performance.

Further, in VTM-3.0, when CIP is enabled, if a neighboring block is coded by Intra Block Copy (IBC), or also known as Current Picture Referencing (CPR), the neighboring block is marked as "unavailable", so the neighboring reconstructed samples of IBC coded blocks cannot be used for intra prediction of current block. This also happens even for intra coded blocks in the first frame coding which do not have a reference frame, and this is not expected. In addition, if IBC uses blocks of the same slice for prediction, the reconstruction can still be used as reference samples of following blocks, without any interference on minimizing the error propagation caused by the packet loss of a different slice using CIP.

In addition, in VTM-3.0, MPM list candidate derivation process is different for adjacent reference line with ISP mode disabled, adjacent reference lines with ISP mode enabled, and non-adjacent reference lines, and MPM list candidate derivation process is complicated in each case without clear benefit in coding efficiency.

Therefore, according to an embodiment, when CIP is enabled, in CCLM mode, no matter whether there is any inter coded block in the above row (and/or left column), the neighboring reference samples may be used to derive the model parameters used in CCLM if they belong to blocks that are intra coded and/or IBC coded.

In one embodiment, it is further restricted that the total number of neighboring reference samples need to be power of 2.

The neighboring sample positions may be scanned in a certain given order, for example, scan from bottom left to top-left, then from top-left to top-right, if the total number reference samples that belong to an intra coded block and/or IBC coded block is N along the scan order, then only the first 1<<Floor(log2(N)) samples along the scanning order are used for deriving the CCLM parameters, where Floor (x) means the mathematical operation that returns the largest integer that is smaller than or equal to the input floating point number.

In an embodiment, when multi-model CCLM is used, then all the neighboring reference samples may be used for deriving the multiple sets of CCLM model parameters if the said neighboring reference samples belong to blocks that are intra coded and/or IBC coded.

In one example, the neighboring reference samples used for deriving the multiple sets of model parameters are classified into two groups. The smallest N samples are used to derive the one set of model parameters used in multi-model CCLM. The largest M samples are used to derive another set of model parameters used in multi-model CCLM. In one example, M and N are powers of 2.

According to an embodiment, when CIP is enabled, if a neighboring sample belongs to a coding block that is IBC coded, it is marked as available for intra prediction, and it can be used for deriving neighboring position which does not have an available reference sample (for example, the sample of a neighboring position is reconstructed using inter coding mode), which is also known as the reference sample padding process, and this neighboring sample can be also used for as the reference samples for the intra prediction of the current block.

In an embodiment, when CIP is enabled, if a neighboring sample belongs to a coding block that is IBC coded, after applying the block vector used in IBC on top of this neighboring sample location, and the block vector is pointing to a location that is outside the current slice/tile/tile group, then this neighboring sample is marked as unavailable, and it cannot be used for intra prediction of current block.

In another embodiment, when CIP is enabled, if a neighboring sample belongs to a coding block that is IBC coded, after applying the block vector used in IBC on top of this neighboring sample location, and the block vector is pointing to a location that is within the current slice/tile/tile group, then this neighboring sample is marked as available, and it can be used for as the reference samples for the intra prediction of the current block.

In an embodiment, when CIP is enabled, if a neighboring sample belongs to a neighboring coding block that is IBC coded, after applying the block vector used in IBC on top of the neighboring block, and part of samples of the neighboring block are pointing to locations that are outside the current slice/tile/tile group, then this neighboring sample is marked as unavailable, and it cannot be used for intra prediction of current block.

In an embodiment, when CIP is enabled, if a neighboring sample belongs to a neighboring coding block that is IBC coded, after applying the block vector used in IBC on top of the neighboring block, and all of samples of the neighboring block are pointing to locations that are within the current slice/tile/tile group, then this neighboring sample is marked as available, and it can be used for intra prediction of current block.

According to an embodiment, when a neighboring block is coded using IBC mode, then it is assigned with a default intra prediction mode (IPM) or a derived IPM, and the assigned IPM may be used for the most probable mode derivation of the current block.

In one embodiment, when a default IPM is assigned, it can be Planar mode, DC mode.

In another embodiment, when a derived IPM is assigned, a reference block is first identified by the block vector (BV) used in IBC mode, then the IPM of the identified reference block is used as the assigned IPM.

In an example, if the identified reference block is coded in IBC mode, then another reference block is identified by the associated BV, and the IPM of the identified another reference block is used as the assigned IPM.

In another example, if the identified reference block is also coded in IBC mode, then another reference block is identified by the associated BV, this process is iterated by up to a given number of times, unless an IPM has been identified, then the identified IPM is used as the assigned IPM, otherwise, a default intra prediction mode, e.g., Planar or DC, is used as the assigned IPM. Example values of the iteration times include, 1, 2, 3, 4.

In another example, if the identified reference block is coded in IBC mode, a default intra prediction mode is assigned, and this default intra prediction mode is used as the assigned IPM. Examples of the default intra prediction mode include: Planar, DC modes In another embodiment, when a derived IPM is assigned, a reference block is first identified by the block vector used in IBC mode, then edge detection is performed on the reconstructed samples of the reference block and an IPM is derived based on the edge detection, finally, the derived IPM is used as the assigned IPM.

Throughout the present disclosure, the line index of the nearest reference line may be 0, and the nearest reference line may be referred to as a zero reference line or adjacent reference line. Other lines may be referred to as non-zero reference lines, or non-adjacent reference lines. candModeList denotes the MPM list, RefLineIdx denotes the reference line index of current block, candIntraPredModeA and candIntraPredModeB denote the left and above neighboring modes. If one neighboring mode is not Planar or DC mode, or one neighboring mode is generating prediction samples according to a given prediction direction, such as intra prediction mode 2~66 as defined in current VVC draft 2, this mode is called angular mode. If one mode is not indicating an directional intra prediction, such as Planar or DC mode, this mode is called non-angular mode. Each intra prediction mode is associated with a mode number (also called intra prediction mode index). For example, in current VVC working draft, Planar, DC, horizontal and vertical intra prediction modes are associated with mode number 0, 1, 18 and 50, respectively. In this document, the MPM index of the first candidate in the MPM list is denoted as 0, and the MPM index of second candidate is denote as 1, and so on.

The variables minAB and maxAB may be derived as follows:
candModeList[0]=candIntraPredModeA
candModeList[1]=candIntraPredModeB
minAB=candModeList[(candModeList[(candModeList[0])>candModeList[1])?1:09
maxAB=candModeList[(candModeList[0]>candModeList[1])?0:1

Two variables offset and mod, may be set according to either scenario shown below:
1) offset=61, mod=64;
2) offset=62, mod=65;

According to an embodiment, zero reference line and non-zero reference lines may share the same MPM list construction process and keep the same order of candidates, Planar and DC modes may be always firstly inserted into the MPM list with index 0 and 1.

In an embodiment, when the size of the MPM list is N, all the candidates in the MPM list can be used for zero reference line, whereas last N−K MPM candidates (except the first two MPM candidates) can be used for the non-zero reference lines MPM list. In this example, N may be a positive integer, such as 3, 4, 5, 6, 7, or 8, and K may also be a positive integer where and K is smaller than N, such as 1, 2, 3, 4. In an example, if N is set to 6, all 6 MPM candidates can be used for the zero reference line whereas the last 4 MPM candidates with MPM index larger than 1 can be used for the non-zero reference lines MPM list.

In another embodiment, when the size of the MPM list is N, only the first N−K MPM candidates can be used for zero reference line whereas only last N−L MPM candidates with MPM index larger than 1 can be used for non-zero reference lines. In this example, N may be a positive integer larger than 3, such as 4, 5, 6, 7, or 8. K and L may also be positive integers, where K and L are each smaller than N, such as 1, 2, 3, 4.

In another embodiment, the reference line index may be signaled after the MPM flag and MPM index. If the MPM index is signaled and larger than one threshold, denoted as Th, then reference line index may be signaled. Otherwise, the reference line index may be derived as a default value, such as 0. Th can be any integer, such as 0, 1, or 2.

In another embodiment, the signaling of MPM index is context coded, and the context depends on whether the neighboring blocks are coded by angular prediction mode.

In another embodiment, the signaling of MPM index is context coded, and the context depends on MPM index (and/or MPM flag) of the neighboring blocks.

In an embodiment, the first bin (or first two bins) of MPM index is context coded, and the context depends on MPM index (and/or MPM flag) of the neighboring blocks In another embodiment, the first two bins of MPM index are context coded, and other bins of MPM indices are bypass coded.

In another embodiment, the neighboring blocks used here are the same with the neighboring blocks used for MPM list generation.

In another embodiment, the context of MPM index depends on whether the MPM flags of neighboring blocks are true and the values of MPM indices of neighboring blocks.

In an embodiment, for the first bin (or first two bins) of MPM index, 3 contexts are used. If both MPM flags of the neighboring blocks are true and MPM indices are equal to or smaller than 1 (or 0), one context is used; Otherwise, if only one of the MPM flag of the neighboring blocks is true and MPM index is equal to or smaller than 1 (or 0), a second context is used. Otherwise, the third context is used.

In an embodiment, for the second bin of MPM index, 3 contexts are used. If both MPM flags of the neighboring blocks are true and MPM indices are equal to 1 (or 0), one context is used; Otherwise, if only one of the MPM flag of the neighboring blocks is true and MPM index is equal to 1 (or 0), a second context is used. Otherwise, the third context is used.

In an embodiment, for the first bin (or first two bins) of MPM index, 2 contexts are used. If at least one of the MPM flag of the neighboring blocks is true and MPM index is equal to or smaller than 1 (or 0), one context is used. Otherwise, a second context is used.

In an embodiment, for the second bin of MPM index, 2 contexts are used. If at least one MPM flag of the neighboring blocks is true and MPM index is equal to 1 (or 0), one context is used; Otherwise, another context is used.

According to an embodiment, for intra mode coding, one flag may be signaled whether the intra prediction mode of a current block (or coding unit) is angular mode or not. When the signaled flag indicates current intra prediction mode is non-angular mode, more than one bin may be signaled to indicate which non-angular mode is used.

In an embodiment, the signaled flag indicates current intra prediction mode is non-angular mode, another flag may be signaled to indicate whether current mode is planar mode or not.

In an embodiment, when the signaled mode is Planar or DC mode, one flag may be used to signal whether PDPC is applied or not.

In an embodiment, if signaled mode is planar mode, another flag may be signaled to indicate which intra smoothing filter is used or not. In one example, two intra smoothing filters can be used for planar mode, one is 3-type [1,2,1] filter, another one is 5-type [1,2,2,2,1] filter.

In another embodiment, if the signaled mode is non-angular mode, another flag may be signaled to indicate which non-angular mode is used.

In an embodiment, more than 2 non-angular modes are used and truncated unary coding is employed to signal which non-angular mode is used. In one example, the truncated unary codeword is bypass coded.

In another embodiment, four non-angular modes may be used, which are Planar mode, DC mode, weighted planar and vertical mode, and weighted planar and horizontal mode.

In an embodiment, the weighted planar and vertical mode means that both the planar mode intra prediction and vertical intra prediction are applied to current block, and two prediction sample blocks are generated, then these two generated prediction sample blocks are equally weighted (or non-equal weighted) to generate the final prediction values.

In an embodiment, the weighted planar and horizontal mode means that both the planar mode intra prediction and horizontal intra prediction are applied to current block, and two prediction sample blocks are generated, then these two generated prediction sample blocks are equally weighted (or non-equal weighted) to generate the final prediction values.

In another embodiment, a new non-angular mode may be used, which may be a weighted sum of two non-angular modes, or may be a weighted sum of one non-angular mode and one angular mode. Here, a weighted sum of two modes may mean that the prediction values of two modes are weighted and added together to generate new prediction values.

In an embodiment, the two non-angular modes include Planar and DC modes.

In an embodiment, the weighting may be a fixed number, e.g. [1,1], or pre-defined number.

In an embodiment, the weighting may depend on the relative sample position within current block.

According to an embodiment, Planar and DC modes may be always inserted into the MPM list with fixed index k1 and k2, where k1 and k2 are both non-negative integers, and k1<k2.

In an embodiment, Planar mode may be always inserted into the MPM list with fixed index 0.

In an embodiment, when reference line index is signaled as 0, for the first bin of the MPM index, 2 contexts are used. If at least one of the neighboring blocks satisfy the following conditions:
1) MPM flag is true,
2) reference line index is 0, and
3) MPM index is smaller than Th,
then the first context may be used. Otherwise, the second context may be used. Th may be a positive integer, such as 1, 2 or 3.

In another embodiment, when reference line index is signaled as 0, for the first bin of the MPM index, only 1 context is used.

In another embodiment, if the above neighboring blocks are beyond the current CTU row, the above neighboring blocks may be be marked as unavailable for MPM index context derivation.

In an embodiment, Planar mode and DC mode may be always inserted into MPM list with fixed index 0 and 2.

In another embodiment, Planar mode and DC mode may be always inserted into MPM list with fixed index 0 and 3.

In another embodiment, Planar mode and DC mode may be always inserted into MPM list with fixed index 0 and 1.

In an embodiment, when reference line index is signaled as 0 and ISP mode is off, first three bins of MPM index may be context coded, and other bins may be bypass coded.

In an embodiment, more than one contexts may be used for the first bin, such as 2 or 3, and one context may be used for the second bin, and one context may be used for the third bin.

In an embodiment, when reference line index is signaled as 0 and ISP mode is on, first two bins of MPM index may be context coded.

In an embodiment, more than one contexts may be used for the first bin, such as 2 or 3, and one context may be used for the second bin.

In an embodiment, when reference line index is signaled as non-zero, first bin of MPM index may be context coded and other bins of MPM index may be bypass coded.

In another embodiment, DC mode may be always inserted into the MPM list with fixed index k. k may be a non-negative integer, such as 2 or 3. 1 context may be used for the entropy coding of the $k^{th}$ (or $(k+1)^{th}$) bin, which indicates whether DC mode is applied.

In an embodiment, when reference line index is signaled as 0, the first bin and $k^{th}$ or $(k+1)^{th}$ bin for MPM index may be context coded, other bins may be by-pass coded.

In another embodiment, when reference line index is signaled as 0, the $1^{st}$–$k^{th}$ (or $(k+1)^{th}$) bin for MPM index may be context coded, other bins may be by-pass coded.

In an embodiment, for the default modes of MPM list, vertical mode (such as mode 50) or horizontal mode (such as mode 18) may be always inserted into MPM list with index 1.

In an embodiment, for the default modes of MPM list, vertical and horizontal modes (such as mode 50 and mode 18) may be always inserted into MPM list with index 1 and 2, respectively, or 2 and 1, respectively.

In an embodiment, the default modes of MPM list may be (Planar, Vertical mode, DC, Horizontal mode, mode 2, mode 34).

In an embodiment, the default modes of MPM list may be (Planar, Vertical mode, Horizontal mode, DC, mode 2, mode 34).

The embodiments above may be applied for intra mode coding of adjacent reference line with ISP mode disabled, adjacent reference line with ISP mode enabled, and non-adjacent reference lines.

In an embodiment, for adjacent reference line with ISP mode disabled, adjacent reference line with ISP mode enabled, and non-adjacent reference lines, the same MPM list construction process may be shared and the same order of candidates may be kept.

In an embodiment, for adjacent reference line with ISP mode enabled, DC mode may be not applied.

In an embodiment, for non-adjacent reference lines, Planar and DC modes may be not applied.

A first flag (for example a primary mode flag) may be coded to indicate whether a primary mode is selected or not, primary modes may include one or more angular mode (such as Planar) and one or more non-angular mode (such as vertical or horizontal mode).

In an embodiment, if the primary mode is chosen, e.g., primary mode flag is signaled as true, a second flag or index may be signaled to indicate which primary mode is chosen.

In an embodiment, the context for coding a bin of the primary mode flag or index depends on the value of corresponding bin of a neighboring primary mode flag or index.

In an embodiment, the flag may be context coded, and the context depends on the value of primary mode flag.

In an embodiment, the primary modes include Planar, one of Horizontal mode and Vertical mode.

In another embodiment, the primary modes include Planar, both Horizontal mode and Vertical mode.

In another embodiment, the primary modes include Planar, DC, both Horizontal mode and Vertical mode.

In an embodiment, if the primary mode is not chosen, a third MPM flag may be signaled to indicate whether an MPM mode is used.

In an embodiment, if the MPM mode is used, a fourth MPM index may be signaled to indicate which MPM mode is used.

In another embodiment, if the MPM mode is not used, a fifth non-MPM index may be signaled to indicate which non-MPM mode is used.

The following describes an example of the modified MPM list generation process on top of VVC draft 3 clause 8.2.2. Input to this process are: a luma location (xCb, yCb) specifying the top-left sample of the current luma coding block relative to the top left luma sample of the current picture, a variable cbWidth specifying the width of the current coding block in luma samples, a variable cbHeight specifying the height of the current coding block in luma samples.

In this process, the luma intra prediction mode IntraPredModeY[xCb][yCb] may be derived. An example of the process is shown below:

1. The candModeList[ x ] with x = 0..5 is derived as follows:
   - If candIntraPredModeB is equal to candIntraPredModeA and candIntraPredModeA is greater than INTRA_DC, candModeList[ x ] with x = 0..5 is derived as follows:
   -
            candModeList[ 0 ] = INTRA_PLANAR
            candModeList[ 1 ] = INTRA_DC
            candModeList[ 2 ] = candIntraPredModeA
            candModeList[ 3 ] = 2 + ( ( candIntraPredModeA + 61 ) % 64 )
            candModeList[ 4 ] = 2 + ( ( candIntraPredModeA − 1 ) % 64 )
            candModeList[ 5 ] = 2 + ( ( candIntraPredModeA + 60 ) % 64 )

- Otherwise if candIntraPredModeB is not equal to candIntraPredModeA and
    candIntraPredModeA or candIntraPredModeB is greater than INTRA_DC, the following
    applies:
    - The variables minAB and maxAB are derived as follows:
        minAB = Min( candIntraPredModeA, candIntraPredModeB )
        maxAB = Max( candIntraPredModeA, candIntraPredModeB )
    - If candIntraPredModeA and candIntraPredModeB are both greater than INTRA_DC,
        candModeList[ x ] with x = 0..5 is derived as follows:
            candModeList[ 0 ] =          INTRA_PLANAR
            candModeList[ 1 ] = INTRA_DC candModeList[ 2 ] = candIntraPredModeA
            candModeList[ 3 ] = candIntraPredModeB
        - If maxAB − minAB is in the range of 2 to 62, inclusive, the following applies:
            candModeList[ 4 ] = 2 + ( ( maxAB + 61 ) % 64 )
            candModeList[ 5 ] = 2 + ( ( maxAB − 1 ) % 64 )
        - Otherwise, the following applies:
            candModeList[ 4 ] = 2 + ( ( maxAB + 60 ) % 64 )
            candModeList[ 5 ] = 2 + ( ( maxAB ) % 64 )
    - Otherwise (candIntraPredModeA or candIntraPredModeB is greater than
        INTRA_DC), candModeList[ x ] with x = 0..5 is derived as follows:

candModeList[ 0 ] = INTRA_PLANAR
            candModeList[ 1 ] = INTRA_DC
            candModeList[ 2 ] = maxAB
            candModeList[ 3 ] = 2 + ( ( maxAB + 61 ) % 64 )
            candModeList[ 4 ] = 2 + ( ( maxAB − 1 ) % 64 )
            candModeList[ 5 ] = 2 + ( ( maxAB + 60 ) % 64 )
- Otherwise, the following applies:

candModeList[ 0 ] = INTRA_PLANAR
            candModeList[ 1 ] = INTRA_DC
            candModeList[ 2 ] = INTRA_ANGULAR50
            candModeList[ 3 ] = INTRA_ANGULAR18
            candModeList[ 4 ] = INTRA_ANGULAR2
            candModeList[ 5 ] = INTRA_ANGULAR34

Figure 16:
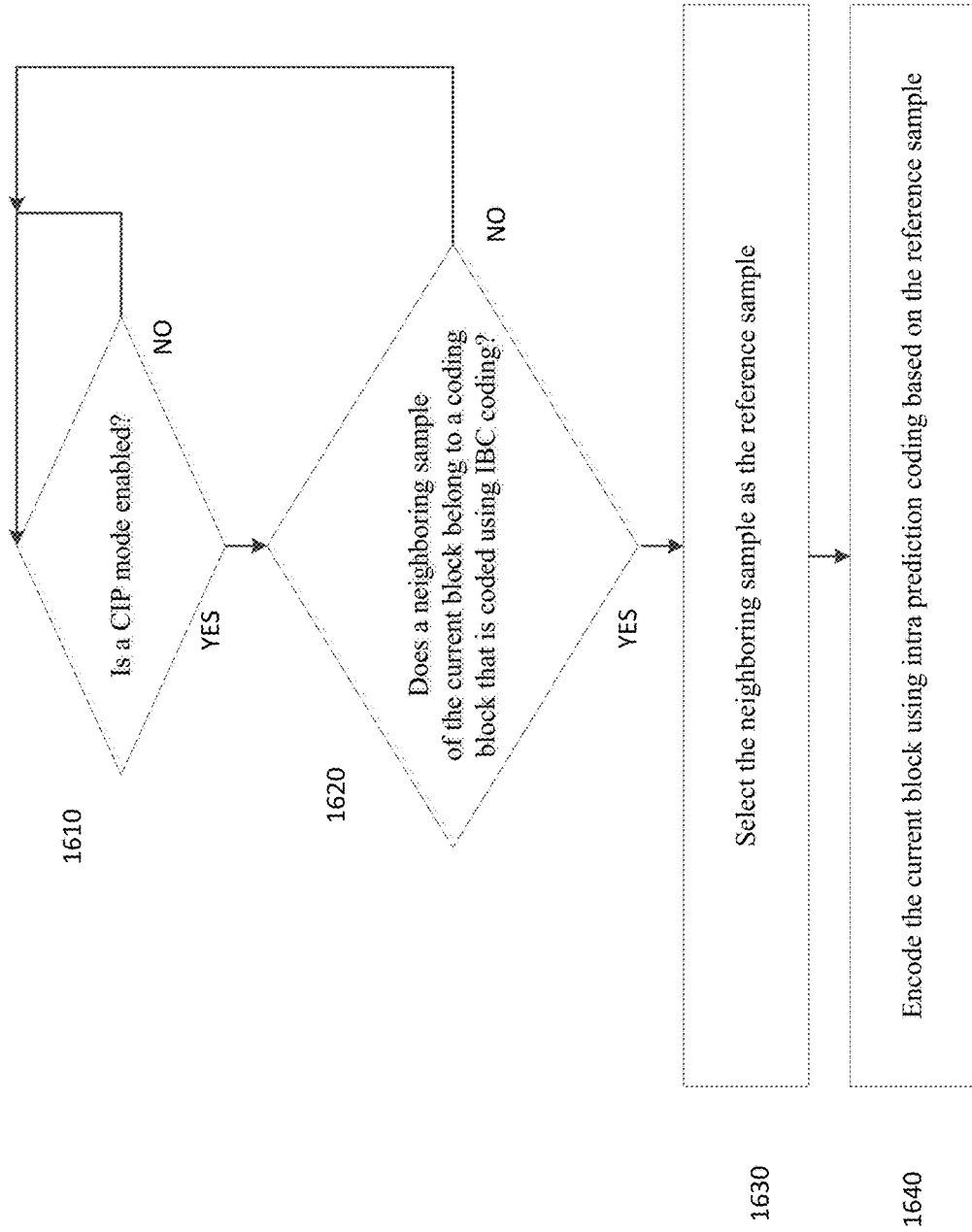
FIG. 16 is a flowchart of an example process for selecting a reference sample used to encode a current block in an encoded video bitstream, according to an embodiment of the present disclosure.

FIG. 16 is a flowchart is a flowchart of an example process 1600 for selecting a reference sample used to encode a current block in an encoded video bitstream. In some implementations, one or more process blocks of FIG. 16 may be performed by decoder 1310. In some implementations, one or more process blocks of FIG. 16 may be performed by another device or a group of devices separate from or including decoder 1310, such as encoder 1303.

As shown in FIG. 16, process 1600 may include determining whether a constrained intra prediction (CIP) mode is enabled (block 1610).

As shown in FIG. 16, if the CIP mode is not enabled, (block 1610—NO), then process 1600 may return to block 1610.

As further shown in FIG. 16, if the CIP mode is enabled (block 1610—YES), then process 1600 may include determining whether a neighboring sample of the current block belongs to a coding block that is coded using intra block copy (IBC) coding (block 1620).

As shown in FIG. 16, if the neighboring sample of the current block does not belong to a coding block that is coded using IBC coding (block 1610—NO), then process 1600 may return to block 1610.

As further shown in FIG. 16, if the neighboring sample of the current block belongs to a coding block that is coded using IBC coding (block 1610—YES), then process 1600 may include selecting the neighboring sample as the reference sample (block 1630).

As further shown in FIG. 16, process 1600 may include encoding the current block using intra prediction coding based on the reference sample (block 1640).

In an embodiment, the neighboring sample may include a first neighboring sample, and the process 1600 further may include determining that a second neighboring sample of the current block belongs to a coding block that is coded using inter prediction coding; based on the determining that the second neighboring sample belongs to the coding block that is coded using the inter prediction coding, selecting the first neighboring sample as the reference sample; and; performing intra prediction of the current block using the reference sample.

In an embodiment, the process 1600 may further include determining that a cross-component linear model (CCLM) mode is enabled; determining that the neighboring sample belongs to a coding block that is coded using one from among IBC coding or intra prediction coding; and based on the determining that the neighboring sample belongs to the coding block that is coded using the one from among the IBC coding or the intra prediction coding, deriving CCLM model parameters based on the reference sample.

In an embodiment, the neighboring sample may be included in a plurality of neighboring samples, and the process 1600 may further may include determining that a multi-model CCLM mode is enabled; and deriving multiple sets of the CCLM model parameters based on the plurality of neighboring samples.

In an embodiment, the neighboring sample may be included in a neighboring block that is given an assigned intra-prediction mode (IPM), and the assigned IPM may be used for derivation of a most-probable mode (MPM) of the current block.

In an embodiment, the assigned IPM may include a default IPM, and the default IPM may include one from among a planar mode or a DC mode.

In an embodiment, the assigned IPM may include a derived IPM, and the derived IPM may include an IPM of a second reference block identified by a block vector used in the IBC coding.

In an embodiment, the process 1600 may further include determining a reference line including the reference sample from among a plurality of reference lines including an adjacent reference line and a plurality of non-adjacent reference lines; determining a plurality of candidate intra prediction modes (IPMs); generating a most probable mode (MPM) list using the plurality of candidate intra prediction modes; wherein, based on the reference line being the adjacent reference line, the MPM list includes all of the plurality of candidate IPMs, and wherein, based on the reference line being one from among the plurality of non-adjacent reference lines, the MPM list includes a subset of the plurality of candidate IPMs, wherein the subset may include less than the all of the plurality of candidate IPMs.

In an embodiment, a DC mode may be always inserted into the MPM list with a fixed MPM index.

In an embodiment, a planar mode and a DC mode may be always inserted into the MPM list, and an MPM index of the planar mode may be lower than an MPM index of the DC mode.

In an embodiment, the encoding may include generating a first flag indicating whether an intra prediction mode (IPM) of the current block is an angular mode or a non-angular mode, wherein, based on the first flag indicating that the IPM of the current block is the non-angular mode, a plurality of bins may be used to signal an identity of the non-angular mode.

In an embodiment, based on based on the first flag indicating that the IPM of the current block is the non-angular mode, the encoding further may include generating a second flag indicating whether the IPM is a planar mode.

Although FIG. 16 shows example blocks of process 1600, in some implementations, process 1600 may include additional blocks, fewer blocks, different blocks, or differently arranged blocks than those depicted in FIG. 16. Additionally, or alternatively, two or more of the blocks of process 1600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 17 shows a computer system 1700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 17 for computer system 1700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1700.

Computer system 1700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1701, mouse 1702, trackpad 1703, touch screen 1710, data-glove 1204, joystick 1705, microphone 1706, scanner 1707, camera 1708.

Computer system 1700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1710, data-glove 1204, or joystick 1705, but there can also be tactile feedback devices that do not serve as input devices), audio output devices (such as: speakers 1709, headphones (not depicted)), visual output devices (such as screens 1710 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1700 can also include human accessible storage devices and their associated media such as optical media including CD/DVD ROM/RW 1720 with CD/DVD or the like media 1721, thumb-drive 1722, removable hard drive or solid state drive 1723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

C Computer system (1700) can also include interface to one or more communication networks (1755). Networks (1755) can for example be wireless, wireline, optical. Networks (1755) can further be local, wide-area, metropolitan, vehicular and industrial, real-time, delay-tolerant, and so on. Examples of networks (1755) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks (1755) commonly require external network interface adapters (1754) that attached to certain general purpose data ports or peripheral buses (1749) (such as, for example USB ports of the computer system (1700); others are commonly integrated into the core of the computer system (1700) by attachment to a system bus as described below (for example Ethernet interface into a PC computer system or cellular network interface into a smartphone computer system). Using any of these networks (1755), computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (1755) and network interfaces (1754) as described above.

Aforementioned human interface devices, human-accessible storage devices, and network interfaces (1754) can be attached to a core (1740) of the computer system (1700).

The core 1740 can include one or more Central Processing Units (CPU) 1741, Graphics Processing Units (GPU) 1742, specialized programmable processing units in the form of Field Programmable Gate Areas (FPGA) 1743, hardware accelerators for certain tasks 1744, and so forth. These devices, along with Read-only memory (ROM) 1745, Random-access memory (RAM) 1746, internal mass storage such as internal non-user accessible hard drives, solid-state drives (SSDs), and the like 1747, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1749. Architectures for a peripheral bus include peripheral component interconnect (PCI), USB, and the like.

CPUs 1741, GPUs 1742, FPGAs 1743, and accelerators 1744 can execute certain instructions that, in combination, can make up the aforementioned computer code. That computer code can be stored in ROM 1745 or RAM 1746. Transitional data can be also be stored in RAM 1746, whereas permanent data can be stored for example, in the internal mass storage 1747. Fast storage and retrieve to any of the memory devices can be enabled through the use of cache memory, that can be closely associated with one or more CPU 1741, GPU 1742, mass storage 1747, ROM 1745, RAM 1746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1700, and specifically the core 1740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1740 that are of non-transitory nature, such as core-internal mass storage 1747 or ROM 1745. The software implementing various embodiments of the present disclosure can be stored in such devices and executed by core 1740. A computer-readable medium can include one or more memory devices or chips, according to particular needs. The software can cause the core 1740 and specifically the processors therein (including CPU, GPU, FPGA, and the like) to execute particular processes or particular parts of particular processes described herein, including defining data structures stored in RAM 1746 and modifying such data structures according to the processes defined by the software. In addition or as an alternative, the computer system can provide functionality as a result of logic hardwired or otherwise embodied in a circuit (for example: accelerator 1744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Acronyms:
HEVC: High Efficiency Video Coding
HDR: high dynamic range
SDR: standard dynamic range
VVC: Versatile Video Coding
JVET: Joint Video Exploration Team
CIP: Constrained Intra Prediction
CCLM: Cross-Component Linear Model
MPM: most probable mode
WAIP: Wide-Angle Intra Prediction
CU: Coding Unit
PU: Prediction Unit
PDPC: Position Dependent Prediction Combination
ISP: Intra Sub-Partitions

The invention claimed is:

1. A method of selecting a reference sample used to encode a current block in an encoded video bitstream using at least one processor, the method comprising:
 determining that a constrained intra prediction (CIP) mode is enabled;
 determining that a cross-component linear model (CCLM) mode is enabled;
 determining that a neighboring sample of the current block belongs to a coding block that is coded using intra block copy (IBC) coding;
 based on the determining that the neighboring sample belongs to the coding block that is coded using the IBC coding, selecting the neighboring sample as the reference sample;
 based on the determining that the CIP is enabled, and that the neighboring sample belongs to the coding block that is coded using the IBC coding, deriving CCLM model parameters based on the reference sample; and
 encoding the current block using intra prediction coding based on the reference sample.

2. The method of claim 1, wherein the neighboring sample comprises a first neighboring sample, and
 wherein the method further comprises:
 determining that a second neighboring sample of the current block belongs to a coding block that is coded using inter prediction coding;
 based on the determining that the second neighboring sample belongs to the coding block that is coded using the inter prediction coding, selecting the first neighboring sample as the reference sample; and
performing intra prediction of the current block using the reference sample.

3. The method of claim 1, further comprising:
determining that the neighboring sample belongs to a coding block that is coded using intra prediction coding; and
based on the determining that the neighboring sample belongs to the coding block that is coded using the intra prediction coding, deriving CCLM model parameters based on the reference sample.

4. The method of claim 3, wherein the neighboring sample is included in a plurality of neighboring samples, and
wherein the method further comprises:
determining that a multi-model CCLM mode is enabled; and
deriving multiple sets of the CCLM model parameters based on the plurality of neighboring samples.

5. The method of claim 1, wherein the neighboring sample is included in a neighboring block that is given an assigned intra-prediction mode (IPM), and
wherein the assigned IPM is used for derivation of a most-probable mode (MPM) of the current block.

6. The method of claim 5, wherein the assigned IPM comprises a default IPM, and
wherein the default IPM comprises one from among a planar mode or a DC mode.

7. The method of claim 5, wherein the assigned IPM comprises a derived IPM, and
wherein the derived IPM comprises an IPM of a second reference block identified by a block vector used in the IBC coding.

8. The method of claim 1, further comprising:
determining a reference line including the reference sample from among a plurality of reference lines including an adjacent reference line and a plurality of non-adjacent reference lines;
determining a plurality of candidate intra prediction modes (IPMs);
generating a most probable mode (MPM) list using the plurality of candidate intra prediction modes;
wherein, based on the reference line being the adjacent reference line, the MPM list includes all of the plurality of candidate IPMs, and
wherein, based on the reference line being one from among the plurality of non-adjacent reference lines, the MPM list includes a subset of the plurality of candidate IPMs, wherein the subset comprises less than the all of the plurality of candidate IPMs.

9. The method of claim 8, wherein a DC mode is always inserted into the MPM list with a fixed MPM index.

10. The method of claim 8, wherein a planar mode and a DC mode are always inserted into the MPM list, and
wherein an MPM index of the planar mode is lower than an MPM index of the DC mode.

11. The method of claim 1, wherein the encoding comprises generating a first flag indicating whether an intra prediction mode (IPM) of the current block is an angular mode or a non-angular mode,
wherein, based on the first flag indicating that the IPM of the current block is the non-angular mode, a plurality of bins are used to signal an identity of the non-angular mode.

12. The method of claim 11, wherein, based on based on the first flag indicating that the IPM of the current block is the non-angular mode, the encoding further comprises generating a second flag indicating whether the IPM is a planar mode.

13. A device for selecting a reference sample used to encode a current block in an encoded video bitstream, the device comprising:
at least one memory configured to store program code; and
at least one processor configured to read the program code and operate as instructed by the program code, the program code including:
first determining code configured to cause the at least one processor to determine that a constrained intra prediction (CIP) mode is enabled;
second determining code configured to cause the at least one processor to determine that a cross-component linear model (CCLM) mode is enabled;
third determining code configured to cause the at least one processor to determine that a neighboring sample of the current block belongs to a coding block that is coded using intra block copy (IBC) coding;
selecting code configured to cause the at least one processor to, based on the neighboring sample belonging to the coding block that is coded using the IBC coding, select the neighboring sample as the reference sample;
first deriving code configured to cause the at least one processor to, based on the CIP being enabled, and based on the neighboring sample belonging to the coding block that is coded using the IBC coding, derive CCLM model parameters based on the reference sample; and
encoding code configured to cause the at least one processor to encode the current block using intra prediction coding based on the reference sample.

14. The device of claim 13, wherein the neighboring sample comprises a first neighboring sample, and
wherein the program code further comprises:
fourth determining code configured to cause the at least one processor to determine that a second neighboring sample of the current block belongs to a coding block that is coded using inter prediction coding;
second selecting code configured to cause the at least one processor to, based on the second neighboring sample belonging to the coding block that is coded using the inter prediction coding, select the first neighboring sample as the reference sample; and
performing code configured to cause the at least one processor to perform intra prediction of the current block using the reference sample.

15. The device of claim 13, wherein the program code further comprises:
fourth determining code configured to cause the at least one processor to determine that the neighboring sample belongs to a coding block that is coded using intra prediction coding; and
second deriving code configured to cause the at least one processor to, based on the neighboring sample belonging to the coding block that is coded using the intra prediction coding, derive CCLM model parameters based on the reference sample.

16. The device of claim 13, wherein the neighboring sample is included in a neighboring block that is given an assigned intra-prediction mode (IPM), and
wherein the assigned IPM is used for derivation of a most-probable mode (MPM) of the current block.

17. The device of claim 13, wherein the program code further comprises:
  fourth determining code configured to cause the at least one processor to determine a reference line including the reference sample from among a plurality of reference lines including an adjacent reference line and a plurality of non-adjacent reference lines;
  fifth determining code configured to cause the at least one processor to determine a plurality of candidate intra prediction modes (IPMs);
  generating code configured to cause the at least one processor to generate a most probable mode (MPM) list using the plurality of candidate intra prediction modes;
  wherein, based on the reference line being the adjacent reference line, the MPM list includes all of the plurality of candidate IPMs, and
  wherein, based on the reference line being one from among the plurality of non-adjacent reference lines, the MPM list includes a subset of the plurality of candidate IPMs, wherein the subset comprises less than the all of the plurality of candidate IPMs.

18. The device of claim 17, wherein a planar mode and a DC mode are always inserted into the MPM list, and
  wherein an MPM index of the planar mode is lower than an MPM index of the DC mode.

19. The device of claim 13, wherein the encoding code further comprises generating code configured to cause the at least one processor to generate a first flag indicating whether an intra prediction mode (IPM) of the current block is an angular mode or a non-angular mode,
  wherein, based on the first flag indicating that the IPM of the current block is the non-angular mode, a plurality of bins are used to signal an identity of the non-angular mode.

20. A non-transitory computer-readable medium storing instructions, the instructions comprising: one or more instructions that, when executed by one or more processors of a device for selecting a reference sample used to encode a current block in an encoded video bitstream, cause the one or more processors to:
  determine that a constrained intra prediction (CIP) mode is enabled;
  determine that a cross-component linear model (CCLM) mode is enabled;
  determine that a neighboring sample of the current block belongs to a coding block that is coded using intra block copy (IBC) coding;
  based on the determining that the neighboring sample belongs to the coding block that is coded using the IBC coding, select the neighboring sample as the reference sample;
  based on the determining that the CIP is enabled, and that the neighboring sample belongs to the coding block that is coded using the IBC coding, derive CCLM model parameters based on the reference sample; and
  encode the current block using intra prediction coding based on the reference sample.

* * * * *